US012641640B2

(12) United States Patent
Kusashima

(10) Patent No.: US 12,641,640 B2
(45) Date of Patent: May 26, 2026

(54) COMMUNICATION DEVICE, BASE STATION APPARATUS, AND COMMUNICATION METHOD

(71) Applicant: SONY GROUP CORPORATION, Tokyo (JP)

(72) Inventor: Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 288 days.

(21) Appl. No.: 18/551,655

(22) PCT Filed: Feb. 15, 2022

(86) PCT No.: PCT/JP2022/005831
§ 371 (c)(1),
(2) Date: Sep. 21, 2023

(87) PCT Pub. No.: WO2022/215350
PCT Pub. Date: Oct. 13, 2022

(65) Prior Publication Data
US 2024/0306197 A1     Sep. 12, 2024

(30) Foreign Application Priority Data
Apr. 5, 2021    (JP) ................................. 2021-064477

(51) Int. Cl.
*H04W 74/0808*     (2024.01)
*H04W 72/21*        (2023.01)
*H04W 72/56*        (2023.01)

(52) U.S. Cl.
CPC ....... *H04W 74/0808* (2013.01); *H04W 72/21* (2023.01); *H04W 72/56* (2023.01)

(58) Field of Classification Search
CPC . H04W 74/0808; H04W 72/21; H04W 72/56; H04W 74/004; H04W 74/006; H04W 16/14
See application file for complete search history.

(56) References Cited

U.S. PATENT DOCUMENTS

| | | | | |
|---|---|---|---|---|
| 2016/0066195 A1* | 3/2016 | Moon | .................. | H04L 5/0085 |
| | | | | 455/454 |
| 2019/0320463 A1* | 10/2019 | Yamada | ............ | H04W 74/0808 |
| 2021/0204322 A1* | 7/2021 | Lou | .................. | H04W 74/0816 |
| 2022/0094497 A1* | 3/2022 | Shibaike | .............. | H04L 1/0027 |
| 2022/0377813 A1* | 11/2022 | Wang | .................... | H04L 1/1861 |

(Continued)

OTHER PUBLICATIONS

International Search Report and Written Opinion of PCT Application No. PCT/JP2022/005831, issued on May 17, 2022, 11 pages of ISRWO.

(Continued)

*Primary Examiner* — Rina C Pancholi
(74) *Attorney, Agent, or Firm* — CHIP LAW GROUP

(57) ABSTRACT

A communication device includes a control unit. The control unit receives an instruction to perform channel sensing in an unlicensed band, from a base station apparatus. The control unit performs the channel sensing in a channel occupancy time in which the instruction is received. The control unit transmits second uplink control information that can be multiplexed with first uplink control information and that indicates a result of the channel sensing, to the base station apparatus, in the channel occupancy time.

14 Claims, 9 Drawing Sheets

(56) References Cited

U.S. PATENT DOCUMENTS

2024/0040617 A1 * 2/2024 Guo ................. H04W 74/0808
2024/0073940 A1 * 2/2024 Chen ................. H04W 74/002

OTHER PUBLICATIONS

Oppo, "Enhancements on intra-UE multiplexing/prioritization", 3GPP TSG-RAN WG1 #104-e, R1-2100184, Jan. 25-Feb. 5, 2021, 06 pages.

Ericsson, "Channel access mechanisms", 3GPP TSG-RAN WG1 #104-e, R1-2101311, Jan. 25-Feb. 5, 2021, 15 pages.

Panasonic, "Discussion on CSI feedback enhancements", 3GPP TSG-RAN WG1 #104-e, R1-2101014, Jan. 25-Feb. 5, 2020, 04 pages.

CATT, "CSI feedback enhancements", 3GPP TSG RAN WG1 #103-e, R1-2007850, Oct. 26-Nov. 13, 2020, 04 pages.

Sony, "Channel access mechanism for 60 GHz unlicensed spectrum", 3GPP TSG RAN WG1 #105-e, R1-2105159, May 10-May 27, 2021, 10 pages.

"3rd Generation Partnership Project; Technical Specification Group Radio Access Network; Study on supporting NR from 52.6 GHz to 71 GHz", 3GPP TR 38.808, Version 1.0.0, Release 17, Dec. 2020, 153 pages.

Moderator (Qualcomm Incorporated): "Email discussion summary for Channel access mechanism for 52.6GHz-71 GHz band, verCM", 3GPP Draft; R1-2101887, 3rd Generation Partnership Project (3GPP), Mobile Competence Centre ; 650, Route Des Lucioles ; F-06921 Sophia-Antipolis Cedex ; France, RAN WG1, Jan. 25, 2021-Feb. 5, 2021 Jan. 30, 2021 (Jan. 30, 2021), XP051975969.

Nokia et al: "Channel access mechanism", 3GPP Draft; R1-2100262, 3rd Generation Partnership Project (3GPP), Mobile Competence Centre ; 650, Route Des Lucioles ; F-06921 Sophia-Antipolis Cedex ; France, RAN WG1, e-Meeting; Jan. 25, 2021-Feb. 5, 2021 Jan. 18, 2021 (Jan. 18, 2021), XP051970884.

* cited by examiner

COMMUNICATION DEVICE, BASE STATION APPARATUS, AND COMMUNICATION METHOD

CROSS REFERENCE TO RELATED APPLICATIONS

This application is a U.S. National Phase of International Patent Application No. PCT/JP2022/005831 filed on Feb. 15, 2022, which claims priority benefit of Japanese Patent Application No. JP 2021-064477 filed in the Japan Patent Office on Apr. 5, 2021. Each of the above-referenced applications is hereby incorporated herein by reference in its entirety.

FIELD

The present disclosure relates to a communication device, a base station apparatus, a communication method, and a communication program.

BACKGROUND

A radio access system and wireless network for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are studied in the 3rd Generation Partnership Project (3GPP). Note that, in the following description, LTE includes LTE-A, LTE-A Pro, and EUTRA, and NR includes NRAT and FEUTRA. A base station apparatus (base station) is also referred to as evolved NodeB (eNodeB) in LTE, and gNodeB in NR. A terminal device (mobile station, mobile station apparatus, or terminal) is also referred to as user equipment (UE) in LTE and NR. LTE and NR are cellular communication systems in which a plurality of areas covered by base station apparatuses is arranged in cells. Note that a single base station apparatus may manage a plurality of cells.

NR is Radio Access Technology (RAT), as a next generation radio access system to LTE, and NR is different from LTE. The NR is an access technology that is configured to support various use cases including Enhanced Mobile Broadband (eMBB), massive Machine Type Communications (mMTC), and Ultra Reliable and Low Latency Communications (URLLC). NR has been studied for a technical framework that satisfies scenarios, requirement conditions, and allocation scenarios in these use cases.

In an unlicensed band and a license shared band, operation of the radio access system based on cellular communication has been studied. In such an unlicensed band, coexistence with other nodes and radio systems is regarded as important, and functions such as listen before talk (LBT) to perform channel sensing before transmission, and discontinuous transmission have been required for the radio access systems such as LTE and NR. Details of a radio access system based on NR in the unlicensed band is disclosed in Non Patent Literature 1. Note that, for example, a 2.4 GHz band, 5 GHz band, 6 GHz band, and 60 GHz band are available as the unlicensed band. For example, a 3.5 GHz band and 37 GHz band are available as a license shared band.

For the unlicensed band, LBT (receiver assisted LBT) using an LBT result on a reception side or a channel measurement result on a reception side has been proposed.

The receiver assisted LBT is an effective technique for a hidden node problem because transmission can be determined on the basis of a channel state on the reception side. Details of the receiver assisted LBT are disclosed in Non Patent Literature 1.

CITATION LIST

Non Patent Literature

Non Patent Literature 1: TR 38.808, "3rd Generation Partnership Project; Technical Specification Group Radio Access Network; Study on supporting NR from 52.6 GHz to 71 GHz (Release 17)," v1.0.0, December 2020.

SUMMARY

Technical Problem

However, it cannot be said that Non Patent Literature 1 sufficiently discloses a specific method for the receiver assisted LBT, and establishment of a mechanism for achieving the receiver assisted LBT is desired. Achievement of the receiver assisted LBT makes it possible to more efficiently resolve the hidden node problem, making the wireless communication link more stable.

Therefore, the present disclosure provides a mechanism that is configured to make a wireless communication link more stable.

Note that the above problem or object is merely one of a plurality of problems or objects that can be solved or achieved by a plurality of embodiments disclosed herein.

Solution to Problem

According to the present disclosure, a communication device is provided. The communication device includes a control unit. The control unit receives an instruction to perform channel sensing in an unlicensed band, from a base station apparatus. The control unit performs the channel sensing in a channel occupancy time in which the instruction is received. The control unit transmits second uplink control information that can be multiplexed with first uplink control information and that indicates a result of the channel sensing, to the base station apparatus, in the channel occupancy time.

DESCRIPTION OF EMBODIMENTS

Figure 1:
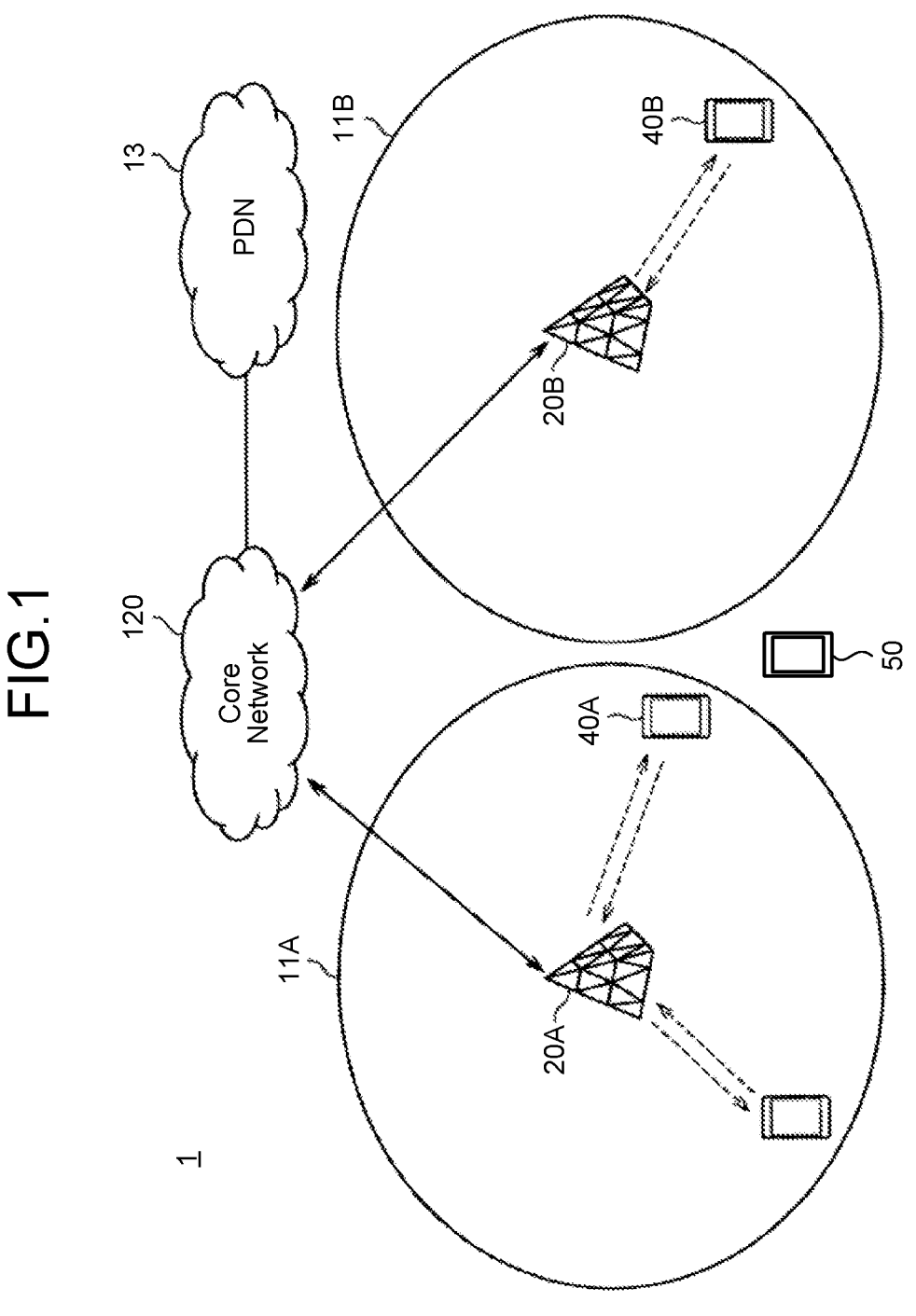
FIG. 1 is a diagram illustrating an exemplary entire configuration of a communication system according to an embodiment of the present disclosure.

Embodiments of the present disclosure will be described in detail below with reference to the accompanying drawings. Note that in the present description and the drawings, component elements having substantially the same functional configurations are denoted by the same reference numerals, and redundant descriptions thereof will be omitted.

Furthermore, in the present description and the drawings, elements having substantially the same functional configurations are distinguished by giving the same reference numerals followed by different alphabets in some cases. For example, a plurality of elements having substantially the same functional configurations is distinguished as necessary, such as, base station apparatuses 20A and 20B. However, when there is no need to particularly distinguish the plurality of elements having substantially the same functional configurations, the elements are denoted by only the same reference numerals. For example, when there is no need to particularly distinguish the base station apparatuses 20A and 20B from each other, the base station apparatuses are simply referred to as base station apparatuses 20.

One or more embodiments (including examples and modifications) which are described below can be implemented independently. Meanwhile, at least some of a plurality of embodiments described below may be appropriately combined with at least some of the other embodiments. The plurality of embodiments can include novel features different from each other. Therefore, the plurality of embodiments can contribute to solving different objects or problems, having different effects.

INTRODUCTION

Exemplary System Configuration

FIG. 1 is a diagram illustrating an exemplary entire configuration of a communication system 1 according to an embodiment of the present disclosure. As illustrated in FIG. 1, the communication system 1 includes a plurality of base station apparatuses 20 (20A and 20B), a plurality of terminal devices 40 (40A and 40B), a core network 120, and a packet data network (PDN) 130. Note that the number of the base station apparatuses 20 and the number of the terminal devices 40 are not limited thereto, and for example, one base station apparatus 20 and one terminal device 40 may be adopted.

Each of the base station apparatuses 20 is a communication device that operates a cell 11 and that provides a wireless communication service to one or more terminal devices 40 located inside the coverage of the cell 11. The cell 11 is operated according to any wireless communication system such as LTE or NR. The base station apparatus 20 is connected to the core network 120. The core network 120 is connected to a packet data network (PDN) 130 via a gateway device (not illustrated). Furthermore, the base station apparatus 20 may include a set of a plurality of physical or logical devices. For example, in the present embodiment of the present disclosure, the base station apparatus 20 may be divided into a plurality of devices of a baseband unit (BBU) and a radio unit (RU) so as to be considered as an assembly of the plurality of devices. Additionally or alternatively, in the embodiments of the present disclosure, the base station apparatus 20 may be either or both of the BBU and the RU. The BBU and the RU may be connected through a predetermined interface (e.g., eCPRI). Additionally or alternatively, the RU may be referred to as remote radio unit (RRU) or radio dot (RD). Additionally or alternatively, the RU may correspond to gNB-DU which is described later. Additionally or alternatively, the BBU may correspond to gNB-CU to be described later. Additionally or alternatively, the RU may be a device integrally formed with an antenna. An antenna of the base station apparatus 20 (e.g., an antenna integrally formed with RU) may adopt an advanced antenna system and support MIMO (e.g., FD-MIMO) or beamforming. In the advanced antenna system, the antennas of the base station apparatus 20 (e.g., the antenna integrally formed with RU) may include, for example, 64 transmission antenna ports and 64 reception antenna ports.

Note that the plurality of base station apparatuses 20 may be connected to each other. One or more base station apparatuses 20 may be included in a radio access network (RAN). In other words, the base station apparatus 20 may be simply referred to as RAN, RAN node, access network (AN), or AN node. RAN in LTE is referred to as enhanced universal terrestrial RAN (EUTRAN). RAN in NR is referred to as NGRAN. RAN in W-CDMA (UMTS) is referred to as UTRAN. Note that the base station apparatus 20 in LTE is referred to as evolved Node B (eNodeB) or eNB. In other words, EUTRAN includes one or more eNodeB nodes (eNBs). Furthermore, the base station apparatus 20 in NR may be referred to as gNodeB or gNB. In other words, NGRAN includes one or more gNBs. Furthermore, EUTRAN may include gNB (en-gNB) connected to a core network (EPC) in an LTE communication system (EPS). Likewise, NGRAN may include ng-eNB that is connected to a core network 5GC in a 5G communication system (5GS). Additionally or alternatively, when the base station apparatus 20 is eNB, gNB, or the like, the base station may be referred to as 3GPP access. Additionally or alternatively, when the base station apparatus 20 is a wireless access point, the base station may be referred to as non-3GPP access. Additionally or alternatively, the base station apparatus 20 may be small cell radio equipment called Remote Radio Head (RRH). Additionally or alternatively, when the base station apparatus 20 is gNB, the base station apparatus 20 may be referred to as a combination of a gNB central unit (CU) and a gNB distributed unit (DU) or any thereof. The gNB central unit (CU) hosts a plurality of upper layers (e.g., RRC, SDAP, and PDCP) of an access stratum, for communication with UE. Meanwhile, the gNB-DU hosts a plurality of lower layers (e.g., RLC, MAC, and PHY) of the access stratum. In other words, among messages/information which are described later, RRC signalling (e.g., various SIBs, RRCSetup messages, and RRCReconfiguration messages including MIB and SIB1) may be generated by the gNB CU, while DCI and various physical channels (e.g., PDCCH and PBCH) which are described later may be generated by the gNB-DU. Alternatively, of RRC signalling, for example, a partial configuration such as IE:cellGroupConfig may be generated by the gNB-DU, and the remaining configurations may be generated by the gNB-CU. These configurations may be transmitted and received through an F1 interface. The base station apparatus 20 may be configured to be communicable with another base station apparatus 20. For example, when the plurality of base station apparatuses 20 is eNBs or has a combination of eNB and en-gNB, the base station apparatuses 20 may be connected through an X2 interface. Additionally or alternatively, when the plurality of base station apparatuses 20 is gNBs or has a combination of gn-eNB and gNB, the base station apparatuses 20 may be connected through an Xn interface. Additionally or alternatively, when the plurality of base station apparatuses 20 has a combination of the gNB central unit (CU) and the gNB distributed unit (DU), the base station apparatuses 20 may be connected through the F1 interface described above. The messages/information (RRC signalling information or DCI information, or physical channel) may be communicated between a plurality of base station apparatuses 20 (e.g., via X2, Xn, or F1 interface).

Furthermore, as described above, the base station apparatus 20 may be configured to manage a plurality of the cells. Each of the cells provided by the base station apparatus 20 is referred to as serving cell. The serving cells may include a primary cell (PCell) and a secondary cell (SCell). When dual connectivity (e.g., EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity) is provided to UE (e.g., the terminal device 40), the PCell and zero or one or more SCell(s) provided by MN (master node) are referred to as master cell group. Furthermore, the serving cell may include a primary secondary cell or primary SCG cell (PSCell). In other words, when dual connectivity is provided to the UE, the PSCell and zero or one or more sCell(s) provided by a secondary node (SN) are referred to as secondary cell group (SCG). Unless otherwise specifically specified (e.g., PUCCH on SCell), a physical uplink control channel (PUCCH) is transmitted on the PCell and PSCell, but is not transmitted on the SCell. Furthermore, radio link failure is also detected on the PCell and the PSCell, but is not detected (may not be detected) on the SCell. As described above, the PCell and the PSCell that play special roles on the serving cell are also referred to as special cell (SpCell). In one cell, one downlink component carrier and one uplink component carrier may be associated with each other. Furthermore, a system bandwidth corresponding to one cell may be divided into a plurality of bandwidth parts (BWPs). In this configuration, one or more bandwidth parts (BWPs) may be set for UE and one of the bandwidth parts may be used as active BWP by the UE. In addition, radio resources (e.g., frequency band and numerology (sub-carrier spacing)) and slot format (slot configuration), used by the terminal device 40, may be different between cells, component carriers, or BWPs.

When the core network 120 is an NR core network (5G Core (5GC)), the core network 120 can include an access and mobility management function (AMF), a session management function (SMF), a user plane function (UPF), a policy control function (PCF), and a unified data management (UDM).

When the core network 120 is an LTE core network (evolved packet core (EPC)), the core network 120 can include a mobility management entity (MME), a serving gateway (S-GW), a PDN gateway (P-GW), a policy and charging rule function (PCRF), and a home subscriber server (HSS). AMF and MME are control nodes that handle control plane signals and manage the movement states (mobility) of the terminal devices 40. UPF and S-GW/P-GW are nodes that handle user plane signals. PCF/PCRF is a control node that performs control of policy and charging, such as quality of service (QoS) for a PDU session or bearer. UDM/HSS is a control node that handles subscriber data and performs service control.

Each of the terminal devices 40 is a communication device that wirelessly communicates with the corresponding base station apparatus 20, on the basis of the control of the base station apparatus 20. For example, the terminal device 40 measures a downlink signal from the base station apparatus 20 and reports measurement information indicating a result of the measurement to the base station apparatus 20. The base station apparatus 20 controls wireless communication with the terminal device 40 on the basis of the reported measurement information. Meanwhile, the terminal device 40 can transmit an uplink signal for measurement to the base station apparatus 20. In this configuration, the base station apparatus 20 measures the uplink signal from the terminal device 40 and controls wireless communication with the terminal device 40 on the basis of information about the measurement. Note that the communication device that performs wireless communication with the base station apparatus 20 is not limited to the terminal device 40. The communication device that performs wireless communication with the base station apparatus 20 can include a terminal device such as a smartphone or a communication device having a relay function.

As described above, the base station apparatuses 20 are configured to transmit and receive information to and from each other by using an interface between base stations. When the core network is 5GC, the interface between base stations may be the Xn interface. When the core network is EPC, the interface between base stations may be the X2 interface. For example, the base station apparatus 20 transmits measurement information (e.g., a measurement result of a cell managed by a source base station apparatus 20 and a measurement result of an adjacent cell) about a terminal device 40, handover of which is predicted, to another adjacent base station apparatus 20. Thus, stable handover is achieved, and the stability of the wireless communication of the terminal device 40 is ensured.

Note that, around the communication system 1, there can be a communication device (e.g., communication device 50) that provides a wireless communication service operated by another RAT such as Wi-Fi (registered trademark) or MulteFire (registered trademark) other than cellular communication. Such a communication device is typically connected to the PDN 130.

For example, the communication device 50 illustrated in FIG. 1 is outside a cell 11A of the base station apparatus 20A, and therefore no carrier sense is detected by the base station apparatus 20A. The communication device 50 close in distance to the terminal device 40A may cause interference with communication between the terminal device 40A and the base station apparatus 20A. The communication device 50 having such a positional relationship is called hidden node, and may affect communication between the base station apparatus 20A and the terminaevice 40A.

Related Art (Channel Access on Unlicensed Channel)

In an unlicensed band channel (hereinafter, also referred to as an unlicensed channel), a wireless communication device (the base station apparatus 20 or the terminal device 40) implements channel access (channel access, medium access, listen before talk) before transmitting a signal. Note that the unlicensed channel is the unit of a frequency band in which channel access is implemented. The channel can also be referred to as carrier, frequency carrier, component carrier, cell, frequency band, LBT band, or the like.

In the channel access, the wireless communication device performs a power measurement (also referred to as carrier sense, sensing, and channel clear assessment: CCA) of the channel and compares a value of power of the channel measured with an energy detection threshold. When the value of power of the channel measured is smaller than the energy detection threshold, the channel is determined to be clear, and when the value of power of the channel measured is larger than the energy detection threshold, the channel is determined to be busy. When it is determined that the channel is clear in all sensing slots, the wireless communication device can obtain a right of transmission on the channel to transmit the signal.

Furthermore, the channel for which the wireless communication device has acquired the right of transmission may be used for transmission by another wireless communication device. In this case, a grant is transmitted from the wireless communication device that has acquired the right of transmission, to the another wireless communication device.

The wireless communication device that acquires the right of transmission on the channel is referred to as initiating device. The other wireless communication device using the channel for which the wireless communication device has acquired the right of transmission is referred to as responding device.

Note that, in 3GPP, four types of LBT categories are defined for carrier sensing. In the channel access, LBT corresponding to any of the following LBT categories is performed.

LBT category 1: No LBT

LBT category 2: LBT without random back-off

LBT category 3: LBT with random back-off with fixed size of contention window

LBT category 4: LBT with random back-off with variable size of contention window Here, the LBT categories will be described with reference to FIGS. 2 to 4.

Figure 2:
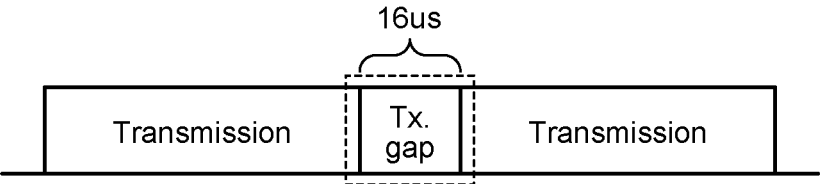
FIG. 2 is a diagram illustrating LBT category 1.

FIG. 2 is a diagram illustrating LBT category 1. As illustrated in FIG. 2, in LBT category 1, the wireless communication device performs communication without performing LBT. In the example of FIG. 2, the wireless communication device performs transmission at a transmission interval of 16 microseconds.

Figure 3:
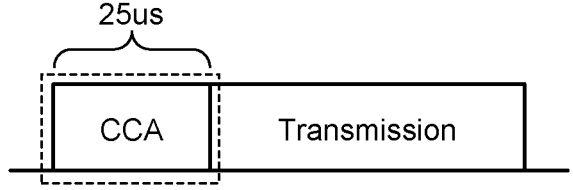
FIG. 3 is a diagram illustrating LBT category 2.

FIG. 3 is a diagram illustrating LBT category 2. As illustrated in FIG. 3, in LBT category 2, the wireless communication device performs LBT without random back-off to perform communication. In the example of FIG. 3, the wireless communication device performs sensing (e.g., CCA) in one sensing slot, and transmits the signal when it is determined that the channel is clear. Here, the length of one sensing slot is 25 microseconds.

Figure 4:
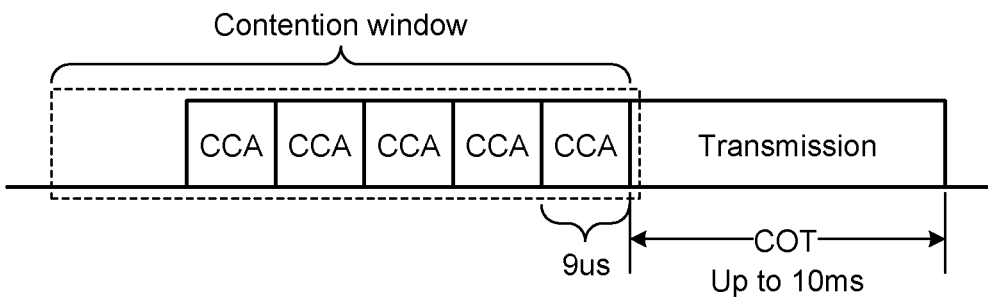
FIG. 4 is a diagram illustrating LBT category 3 and LBT category 4.

FIG. 4 is a diagram illustrating LBT category 3 and LBT category 4. As illustrated in FIG. 4, in LBT category 3 and LBT category 4, the wireless communication device performs sensing (e.g., CCA) a predetermined number of times within a contention windows (CWs), and transmits a signal when it is determined that the channel is clear. In other words, the wireless communication device performs sensing (e.g., CCA) in a predetermined number of sensing slots, and transmits the signal when it is determined that the channel is clear in all of the sensing slots. FIG. 4 illustrates that the length of one sensing slot is 9 microseconds and sensing (e.g., CCA) is performed five times. Note that LBT category 3 and LBT category 4 are different in whether the size of the contention window is fixed or variable. Alternatively, LBT category 3 and LBT category 4 are different in whether the size of the contention window is adjusted.

(Channel Access Procedure on Unlicensed Channel)

A channel access (channel access, listen before talk) procedure (channel access type) is performed to access the unlicensed channel for transmission by the base station apparatus 20 or the terminal device 40.

In the channel access procedure defined as load-based equipment (LBE, dynamic channel access, and channel access procedure in dynamic channel occupancy), channel sensing is performed once or more times. On the basis of a result of the sensing, a determination (determination of clear channel) of whether the channel is idle (unoccupied, available, enable) or whether the channel is busy (occupied, unavailable, disable) is made. In the channel sensing, the power of channel in a predetermined waiting time is sensed.

Examples of the waiting time in the channel access procedure include a first waiting time (slot), a second waiting time, a third waiting time (defer period), and a fourth waiting time.

The slot is the unit of waiting time of each of the base station apparatus 20 and the terminal device 40 in the channel access procedure. For example, the slot is defined as 9 microseconds.

In the second waiting time, one slot is inserted at the beginning. The second waiting time is defined as, for example, 16 microseconds.

The defer period includes the second waiting time and a plurality of sequential slots subsequent to the second waiting time. The number of sequential slots subsequent to the second waiting time is determined on the basis of a priority class (channel access priority class) used to satisfy QoS.

The fourth waiting time includes the second waiting time and subsequent one slot. The fourth waiting time is defined as, for example, 25 microseconds.

The base station apparatus 20 or the terminal device 40 senses a predetermined channel during a predetermined slot duration. When power detected by the base station apparatus 20 or the terminal device 40 for at least 4 microseconds in the period of the predetermined slot is smaller than a predetermined energy detection threshold, the predetermined slot is regarded as idle. Meanwhile, when the power is larger than the predetermined energy detection threshold, the predetermined slot is regarded as busy.

The channel access procedure includes a first channel access procedure, a second channel access procedure, and a third channel access procedure. The first channel access procedure is performed by using a plurality of slots and the defer period. The second channel access procedure is performed by using one period of the second waiting time or fourth waiting time. The third channel access procedure is performed by using the second waiting time.

Channel access parameter are determined on the basis of the priority classes. Examples of the channel access parameters include a minimum contention window, a maximum contention window, a maximum channel occupancy time, and allowed contention window sizes. The priority class is determined by a value of a QoS class identifier (QCI) or 5G QoS identifier (5QI) that handles the quality of service (QoS). A correspondence table between the priority classes and channel access parameters is shown in Table 1, and an example of mapping between the priority classes and QCIs is shown in Table 2. Table 3 shows an example of mapping between priority classes and 5QI.

TABLE 1

| CHANNEL ACCESS PRIORITY CLASS (p) | $m_p$ | MINIMUM CONTENTION WINDOW $CW_{min, p}$ | MAXIMUM CONTENTION WINDOW $CW_{max, p}$ | MAXIMUM CHANNEL OCCUPANCY TIME $T_{mcot, p}$ | ALLOWED CONTENTION WINDOW $CW_p$ SIZES |
|---|---|---|---|---|---|
| EXAMPLE OF CORRESPONDENCE TABLE BETWEEN PRIORITY CLASSES AND CHANNEL ACCESS PARAMETERS | | | | | |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

EXAMPLE OF MAPPING BETWEEN
PRIORITY CLASSES AND QCIs

| CHANNEL ACCESS PRIORITY CLASS (p) | QCI |
|---|---|
| 1 | 1, 3, 5, 65, 66, 69, 70 |
| 2 | 2, 7 |
| 3 | 4, 6, 8, 9 |
| 4 | OTHER |

TABLE 3

EXAMPLE OF MAPPING BETWEEN
PRIORITY CLASSES AND 5QI

| CHANNEL ACCESS PRIORITY CLASS (p) | QCI |
|---|---|
| 1 | 1, 3, 5, 65, 66, 67, 69, 70, 79, 80, 82, 83, 84 |
| 2 | 2, 7, 71 |
| 3 | 4, 6, 8, 9, 72, 73, 74, 76 |
| 4 | — |

(Details of First Channel Access Procedure)

The first channel access procedure (Type 1 channel access procedure) is classified into LBT category 3 or LBT category 4.

In the first channel access procedure, the following steps are performed.

(0) Channel sensing is performed during the defer period. When the channel is idle in a slot in the defer period, the procedure proceeds to step (1), and otherwise, the procedure proceeds to step (6).

(1) An initial counter value is acquired. An allowed value of the initial counter value is an integer of 0 to a value of the contention window CW. The initial counter value is determined at random according to a uniform distribution. The initial counter value is set to a counter N, and the procedure proceeds to step (2).

(2) When the counter N is larger than 0 and decrement of the counter N is selected, 1 is decremented from the counter N. Then, the procedure proceeds to step (3).

(3) An additional slot duration for standby. Channel is sensed for the additional slot duration. When the additional slot is idle, the procedure proceeds to step (4), and otherwise, the procedure proceeds to step (5).

(4) When the counter N is 0, this procedure is stopped. Otherwise, the procedure proceeds to step (2).

(5) An additional defer period for standby. Furthermore, channel is sensed until either of the slots included in the additional defer period is detected busy, or until all of the slots included in the additional defer period are detected idle. Then, the procedure proceeds to step (6).

(6) When the channel is sensed idle in all of the slots included in the additional defer period, the procedure proceeds to step (4), and otherwise, the procedure proceeds to step (5).

After the stop in step (4) of the above procedure, transmission is performed including data such as PDSCH and PUSCH, in the channel.

Note that after the stop of step (4) in the above procedure, transmission may not be performed in the channel. In this case, when the channel is idle in all of the slots and defer period immediately before the transmission, subsequent transmission may be performed without performing the procedure described above. Meanwhile, when the channel is not idle in either of the slots or the defer period, the procedure proceeds to step (1) described above, after the channel is sensed to be idle in all of the slots during the additional defer period.

(Details of Second Channel Access Procedure)

The second channel access procedure (Type 2 channel access procedure) is classified into LBT category 2. In the second channel access procedure, transmission may be performed immediately after the channel is determined as idle, as a result of the sensing at least during the second waiting time or the fourth waiting time. Meanwhile, when it is determined that the channel is not idle, as a result of the sensing at least during the second waiting time or the fourth waiting time, no transmission is performed. The second channel access procedure is applied when the transmission interval is 16 microseconds or 25 microseconds.

The second channel access procedure using the fourth waiting time is referred to as Type 2A channel access procedure, and the second channel access procedure using the second waiting time is referred to as Type 2B channel access procedure.

(Details of Third Channel Access Procedure)

The third channel access procedure (Type 2C channel access procedure) is classified into LBT category 1. In the third channel access procedure, the channel is not sensed before transmission. The third channel access procedure is applied when the transmission interval is 16 microseconds or less.

(Indication of Channel Access Type)

In the terminal device 40, the channel access procedure (channel access type) is indicated by DCI in some cases. The field ChannelAccess-CPext or ChannelAccess-CPext-CAPC included in the DCI specifies the channel access type applied immediately before transmission of PUSCH or PUCCH. The field ChannelAccess-CPext is included in fallback DCI (DCI format 0_0, DCI format 1_0), and the ChannelAccess-CPext-CAPC field is included in non-fall-back DCI (DCI format 0_1, DCI format 1_1, etc.). Down-link grant DCI (DCI format 1_x) indicates the channel access type of the PUCCH, and uplink grant DCI (DCI format 0_x) indicates the channel access type of scheduled PUSCH. Note that terminal group common DCI (DCI format 2_x) may indicate the channel access type of con-figured grant PUSCH.

(Contention Window Adaptation Procedure)

In LBT category 4, a contention window adaptation procedure is performed.

The contention window CW used in the first channel access procedure is determined on the basis of the conten-tion window adaptation procedure.

The value of the contention window CW is held for each priority class. In addition, the contention window CW has a value between those of a minimum contention window and maximum contention window. The minimum contention window and the maximum contention window are deter-mined on the basis of the priority class.

The value of the contention window CW is adjusted before step (1) of the first channel access procedure. When the rate of negative acknowledgement (NACK) is higher than a threshold in HARQ response for a shared channel in a reference HARQ process on a reference sub-frame (ref-erence slot and reference period) in at least the contention window adaptation procedure, the value of the contention window CW is increased, and otherwise, the value of the contention window CW is set to the minimum contention window.

The value of the contention window CW is increased on the basis of, for example, the following formula: $CW=2 \cdot (CW+1)-1$.

The reference period is defined as a period from the beginning of the occupied channel to the tail of the first slot including at least one unicast PDSCH, or to the tail of the first transmission burst including at least one unicast PDSCH. For example, 90% is set as the threshold.

(Details of Downlink Channel Access Procedure)

When downlink transmission including PDSCH, PDCCH, and/or EPDCCH is performed on the unlicensed channel, the base station apparatus 20 accesses the channel on the basis of the first channel access procedure, and performs the downlink transmission.

Meanwhile, when the downlink transmission including DRS but not including PDSCH is performed on the unli-censed channel, the base station apparatus 20 accesses the channel on the basis of the second channel access procedure, and performs the downlink transmission. Note that the period of the downlink transmission is preferably smaller than 1 millisecond.

(Details of Uplink Channel Access Procedure)

In the unlicensed channel, when the first channel access procedure through the uplink grant scheduling PUSCH is indicated, the terminal device 40 performs the first channel access procedure before uplink transmission including the PUSCH.

In addition, when the second channel access procedure through the uplink grant scheduling PUSCH is indicated, the terminal device 40 performs the second channel access procedure before uplink transmission including the PUSCH.

Furthermore, for uplink transmission not including PUSCH but including SRS, the terminal device 40 performs the second channel access procedure before the uplink transmission.

Furthermore, when the tail end of the uplink transmission indicated through the uplink grant is in an uplink duration (UL duration), the terminal device 40 performs the second channel access procedure before the uplink transmission, regardless of the type of procedure indicated through the uplink grant.

In addition, when uplink transmission continues through the fourth waiting time after the end of downlink transmis-sion from the base station apparatus 20, the terminal device 40 performs the second channel access procedure before the uplink transmission.

(Channel Access Procedure for NR in Present Embodiment)

In the channel access procedure on the unlicensed channel by using NR, channel sensing without beamforming and channel sensing with beamforming are performed.

The channel sensing without beamforming is channel sensing based on reception whose directivity is not con-trolled or channel sensing having no direction information. The channel sensing having no direction information is, for example, channel sensing having averaged measurement results in all directions. A transmitting station (the terminal device 40) may not recognize the directivity (angle, direc-tion) used in the channel sensing.

The channel sensing with beamforming is channel sensing based on reception whose directivity is controlled or channel sensing having direction information. In other words, the channel sensing with beamforming is channel sensing hav-ing a reception beam directed in a predetermined direction. The transmitting station (the terminal device 40) having a function of performing channel sensing with beamforming is configured to perform channel sensing using different direc-tivities once or more.

Performing the channel sensing with beamforming nar-rows an area to be detected by the sensing. Therefore, the transmitting station (the terminal device 40) is allowed to reduce the frequency of detecting a communication link with no interference, reducing the exposure node problem.

(Channel Access Performed by Frame Based Equipment (FBE))

Figure 5:
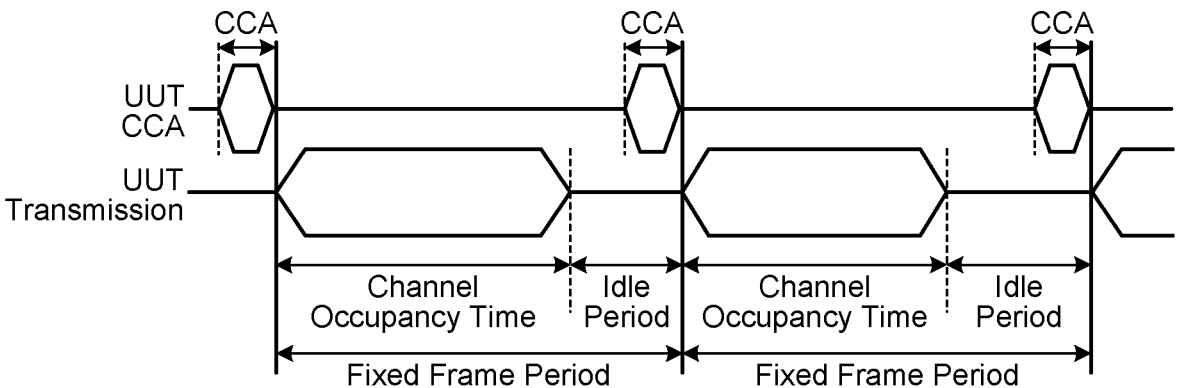
FIG. 5 is a diagram illustrating an overview of frame based equipment (FBE).

FIG. 5 is a diagram illustrating an overview of frame based equipment (FBE). The upper part of FIG. 5 illustrates the timing of channel clear assessment (CCA) with the horizontal axis as the time axis. The lower part of FIG. 5 illustrates the timing of transmission with the horizontal axis as the time axis.

As illustrated in FIG. 5, in the channel access (listen before talk) procedure, defined as the frame based equip-ment (FBE, semi-static channel access, and channel access procedure in semi-static channel occupancy), channel sensing is performed once before transmission. On the basis of a result of the sensing, a determination (determination of clear channel) of whether the channel is idle (unoccupied, available, enable) or whether the channel is busy (occupied, unavailable, disable) is made. In the channel sensing, the power of channel in a predetermined waiting time is sensed.

A transmit and/or receive structure used for the frame based equipment has a periodic timing called fixed frame period.

The fixed frame period is set, in channel access performed by the frame based equipment. The fixed frame period is set within the range of 1 millisecond and 10 milliseconds. The fixed frame period can be changed only once every 200 milliseconds.

In the channel access performed by the frame based equipment, the equipment performs channel sensing, immediately before starting transmission at the start of the fixed frame period. The equipment performs sensing once by using one slot of 9 microseconds or less. As a result of sensing the channel, when the value of power is larger than the predetermined energy detection threshold, the channel is considered busy. Meanwhile, when the value of power is smaller than the predetermined energy detection threshold, the channel is clear, and the equipment is allowed to perform transmission. The equipment is allowed to perform transmission during a channel occupancy time. The equipment is allowed to have multiple transmissions without performing sensing, when a gap between the multiple transmissions is 16 microseconds or less and in the channel occupancy time. Meanwhile, when the gap between the multiple transmissions exceeds 16 microseconds, the equipment needs to perform additional channel sensing. Likewise, the additional channel sensing is also performed once by using one slot.

The channel occupancy time in the channel access performed by the frame based equipment does not exceed 95% of the fixed frame period. An idle period in channel access performed by the frame based equipment is 5% or more of the fixed frame period. Note that the idle period is 100 microseconds or more.

Transmission of responses (ACK/NACK and HARQ-ACK) to the transmission from the equipment may be performed in the channel occupancy time.

The fixed frame period is reported to the terminal device 40 by a system information block (SIB). The idle period and/or the maximum channel occupancy time may be reported together with the fixed frame period.

The fixed frame period, the idle period, and/or the maximum channel occupancy time may be different for each device. Specifically, the fixed frame period of the base station apparatus 20 and the fixed frame period of the terminal device 40 may be different from each other. The terminal device 40 receives and sets configuration information (configuration information about the channel occupancy time (COT) started by the base station apparatus 20) about the fixed frame period of the base station apparatus 20 and configuration information (configuration information about the COT started by the terminal device 40) about the fixed frame period of the terminal device 40, as individual information.

Furthermore, the starting point of the fixed frame period of the base station apparatus 20 and the starting point of the fixed frame period of the terminal device 40 may be different from each other.

(COT(Channel Occupancy Time))

In an unlicensed band operation, the wireless communication device performs LBT. When it is determined that the channel is clear as a result of LBT, the channel can be occupied for a predetermined time. The predetermined time during which the channel can be occupied after LBT is referred to as channel occupancy time (COT).

A COT length of the COT (base station apparatus start COT) acquired by the base station apparatus 20 is reported to the terminal device 40 by using DCI format 2_0. The terminal device 40 recognizes the length of the base station apparatus start COT on the basis of cot length indication (COT length indicator) included in the DCI format 2_0.

Furthermore, the terminal device 40 can implicitly recognize the COT from PDSCH scheduling from the base station apparatus 20.

Furthermore, the terminal device 40 can implicitly recognize the COT from downlink physical signals (SS/PBCH block, CSI-RS, and PDCCH DMRS) from the base station apparatus 20.

The COT length of the COT (terminal device start COT) acquired by the terminal device 40 is reported to the base station apparatus 20 by using CG-UCI. The base station apparatus 20 recognizes the length of the terminal device start COT on the basis of COT sharing information included in the CG-UCI.

(Processing Time)

In NR, a minimum processing time (processing time, calculation time) from reception of an indication to transmission of a signal generated is defined. when a period from the indication and the transmission timing is shorter than the processing time, it is difficult for the terminal device 40 to perform effective uplink transmission. In NR, a PDSCH processing time, a PUSCH processing time, and a CSI computation time are specified.

(PDSCH Processing Time)

The PDSCH processing time is defined as a minimum time between the end of the last symbol of PDSCH and the start of the first symbol of PUCCH carrying HARQ-ACK corresponding to the PDSCH. When a feedback timing longer than the PDSCH processing time is specified, the terminal device 40 can provide a valid HARQ-ACK message. Meanwhile, when the feedback timing shorter than the PDSCH processing time is specified, the terminal device 40 cannot provide the valid HARQ-ACK message.

The PDSCH processing time $T_{proc, 1}$ is defined by the following Formula (1).

$$T_{proc,1} = (N_1 + d_{1,1} + d_2)(2048 + 144) \cdot \kappa 2^{-\mu} \cdot T_C + T_{ext} \qquad (1)$$

Here, $N_1$ indicates a PDSCH decoding time. A terminal device 40 supporting PDSCH processing capability 1 refers to Table 4, and A terminal device 40 supporting PDSCH processing capability 2 refers to Table 5.

TABLE 4

PDSCH PROCESSING TIME FOR PDSCH PROCESSING CAPABILITY 1

PDSCH decoding time N1 [symbols]

| μ | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 5

| μ | PDSCH decoding time N1 [symbols] dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

In Formula (1), μ is an index indicating sub-carrier spacing and can take a value of "0" to "6" (see Tables 4 and 5, and further Tables 8 to 11 described later.). Note that "0" indicates 15 kHz, "1" indicates 30 kHz, "2" indicates 60 kHz, "3" indicates 120 kHz, "4" indicates 240 kHz, "5" indicates 480 kHz, and "6" indicates 960 kHz.

$T_{ext}$ indicates the length of a CP extension. For $T_{ext}$, the length of the CP extension is set for a shared spectrum channel access operation, and 0 is set for a non-shared spectrum channel access operation.

When the position of an additional DMRS of PDSCH is 12, $N_{1,0}$ is 14, and otherwise, $N_{1,0}$ is 13.

When high-priority PUCCH overlaps with a low-priority PUCCH or PUSCH, a value reported from the terminal device 40 is set to d2, and otherwise, 0 is set to d2.

In PDSCH mapping type A, when an index i of a PDSCH end symbol is smaller than 7, $d_{1,1}$ is 7-i, and otherwise, $d_{1,1}$ is 0.

In PDSCH mapping type B and PDSCH processing capability 1, when a PDSCH symbol length L is 7 or more, $d_{1,1}$ is 0, and when the PDSCH symbol length L is 4 or more and 6 or less, $d_{1,1}$ is 7-L. In addition, when the PDSCH symbol length L is 3, $d_{1,1}$ is 3+min(d, l), and when the PDSCH symbol length L is 2, $d_{1,1}$ is 3+d. Here, d is the number of symbols on which PDCCH and PDSCH overlap.

In PDSCH mapping type B and PDSCH processing capability 2, when the PDSCH symbol length L is 7 or more, $d_{1,1}$ is 0, and when the PDSCH symbol length L is 3 or more and 6 or less, $d_{1,1}$ is d. In addition, when the PDSCH symbol length L is 2 and scheduled PDCCH is a 3-symbol CORESET and CORESET and PDSCH have the same start symbol, $d_{1,1}$ is 3, and otherwise, $d_{1,1}$ is d.

Furthermore, κ is 64, $T_c$ is $1/(\Delta f_{max} N_f)$, $\Delta f_{max}$ is 480 kHz, and $N_f$ is 4096.

(CSI Computation Time)

The CSI computation time is defined as a minimum time between the end of the last symbol of PDCCH including the indication of a CSI report trigger and the start of the first symbol of the PUSCH including a CSI report. When feed-back timing longer than the CSI computation time is specified, the terminal device 40 can provide valid CSI report.

As the CSI computation time, two types of $T_{proc,\ CSI}$ and $T'_{proc,CSI}$ are defined. $T_{proc,CSI}$ is a minimum time between the end of the last symbol of PDCCH including the indication of the CSI report trigger and the start of the first symbol of PUSCH including the CSI report corresponding to the CSI report trigger. $T'_{proc,CSI}$ is a minimum time between the end of the last symbol of aperiodic CSI-RS resource corresponding to the triggered nth CSI report and the start of the first symbol of PUSCH including the nth CSI report. The aperiodic CSI-RS resource corresponding to the triggered nth CSI report includes, for example, an aperiodic CSI-RS resource for channel measurement, an aperiodic CSI-RS resource for interference measurement, and an aperiodic non-zero power CSI-RS resource for interference measurement.

$T_{proc,CSI}$ and $T'_{proc,CSI}$ are defined by the following Formulas (2) and (3).

$$T_{proc,CSI} = (Z)(2048 + 144) \cdot \kappa 2^{-\mu} \cdot T_C + T_{switch} \tag{2}$$

$$T'_{proc,CSI} = (Z')(2048 + 144) \cdot \kappa 2^{-\mu} \cdot T_C \tag{3}$$

Here, $T_{switch}$ is a switching gap duration. In addition, Z and Z' are defined by the following Formulas (4) and (5).

$$Z = \max_{m=0,\ldots,M-1} (Z(m)) \tag{4}$$

$$Z' = \max_{m=0,\ldots,M-1} (Z'(m)) \tag{5}$$

Where M is the number of CSI reports updated. (Z(m), Z'(m)) corresponds to the updated mth CSI report, and values of Table 6 and Table 7 are referenced to according to conditions.

TABLE 6

CSI COMPUTATION DELAY REQUIREMENT 1

| μ | $Z_1$ [symbols] | |
|---|---|---|
|   | $Z_1$ | $Z'_1$ |
| 0 | 10 | 8 |
| 1 | 13 | 11 |
| 2 | 25 | 21 |
| 3 | 43 | 36 |

17

TABLE 7

| CSI COMPUTATION DELAY REQUIREMENT 2 | | | | | |
|---|---|---|---|---|---|
| $Z_1$ [symbols] | | $Z_2$ [symbols] | | $Z_3$ [symbols] | |
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

Specifically, when the following conditions are satisfied, $Z_1$ and $Z'_1$ of Table 6 are referenced to, as $Z(m)$ and $Z'(m)$.

Not all CSI processing units (CPU) are occupied.

The CSI to be transmitted is a single CSI and corresponds to wideband frequency-granularity.

The CSI to be transmitted corresponds to at most four CSI-RS ports in a single resource without CRI report.

When codebookType is set to TypeI-SinglePanel or reportQuantity is set to cri-RI-CQI, the CSI is triggered without a PUSCH with either transport block or HARQ-ACK.

In addition, when the following conditions are satisfied, $Z_1$ and $Z'_1$ of Table 7 are referenced to, as $Z(m)$ and $Z'(m)$.

The CSI to be transmitted corresponds to wideband frequency-granularity.

The CSI to be transmitted corresponds to at most four CSI-RS ports in a single resource without CRI report.

codebookType is set to TypeI-SinglePanel or reportQuantity is set to cir-RI-CQI.

In addition, when the following conditions are satisfied, $Z_1$ and $Z'_1$ of Table 7 are referenced to, as $Z(m)$ and $Z'(m)$.

The CSI to be transmitted corresponds to wideband frequency-granularity.

codebookType is set to ssb-Index-SINR or reportQuantity is set to cri-SINR.

In addition, when the following conditions are satisfied, $Z_3$ and $Z'_3$ of Table 7 are referenced to, as $Z(m)$ and $Z'(m)$.

reportQuantity is set to cri-RSRP or ssb-Index-RSRP.

When any of the conditions is not satisfied, $Z_2$ and $Z'_2$ of Table 7 are referenced to.

History

In NR-Unlicensed (NR-U), it is assumed that the NR-U supports various use cases, such as dual connectivity, stand-alone NR-U operated only with an unlicensed band, and a DL carrier and a UL carrier one of which is a licensed band and the other of which is the unlicensed band (e.g., licensed DL+unlicensed UL), in addition to licensed assisted access (LAA) using a carrier aggregation mechanism.

In general, in the unlicensed band (unlicensed spectrum, shared spectrum, and band on which CCA operation is required.), the communication device (the base station apparatus 20 or the terminal device 40) performs channel sensing before transmitting a physical channel and/or a physical signal to perform listen before talk (LBT) to determine whether the channel is clear or busy. When the channel is clear (LBT success), it is possible for the communication device to transmit the physical channel and/or the physical signal. Meanwhile, when the channel is busy (failure in LBT), it is impossible for the communication device to transmit the physical channel and/or the physical signal.

For the unlicensed band, LBT (receiver assisted LBT) using an LBT result on the reception side or channel measurement has been proposed. Examples of a type of the receiver assisted LBT includes request to send (RTS)/clear to send (CTS) introduced in IEEE 802.11. When a transmission device and a reception device perform LBT and all the LBTs are successfully performed, data transmission is started. The receiver assisted LBT is an effective technique for a hidden node problem because transmission can be determined on the basis of a channel state (interference state) on the reception side.

In NR-U as well, in the receiver assisted LBT, a procedure of feeding back information (CSI, LBT results, etc.) about interference in COT in the same COT has been studied.

For example, the transmission device (the base station apparatus 20 or the terminal device 40) performs LBT to acquire a transmission opportunity (COT). After acquiring the COT, the transmission device (the base station apparatus 20 or the terminal device 40) transmits an indication of LBT to the reception device (the terminal device 40 or the base station apparatus 20). The reception device (the terminal device 40 or the base station apparatus 20) performs LBT on the basis of the indication from the transmission device, and feeds back the LBT result. The transmission device (the base station apparatus 20 or the terminal device 40) controls subsequent downlink transmission on the basis of the fed back LBT result.

In the receiver assisted LBT, instead of the LBT on the reception device (the terminal device 40 or the base station apparatus 20) side, interference measurement and interference information may be fed back. In this case, the reception device (the terminal device 40 or the base station apparatus 20) measures interference instead of LBT, and feeds back the measured interference to the transmission device (the base station apparatus 20 or the terminal device 40).

R1-2100202 and R1-2101458 disclose that LBT is indicated to the terminal device 40 by DCI for scheduling PDSCH, and the LBT result is fed back on PUCCH or PUSCH. Furthermore, R1-2100434 discloses a method of semi-statically setting a PUCCH occasion corresponding to a PDCCH monitoring occasion of DCI indicating LBT as timing of feedback of the LBT result. However, details of a transmission method for the LBT result are not disclosed in these.

R1-2101311 discloses that aperiodic CSI feedback is used for a feedback method for information about interference in the receiver assisted LBT. However, conventional CSI measurement and feedback method takes time for CSI computation, and is not effective for a method achieving the receiver assisted LBT.

Therefore, the present inventors have found a mechanism for feeding back information about interference to achieve effective receiver assisted LBT.

Overview of Proposed Technology

Figure 6:
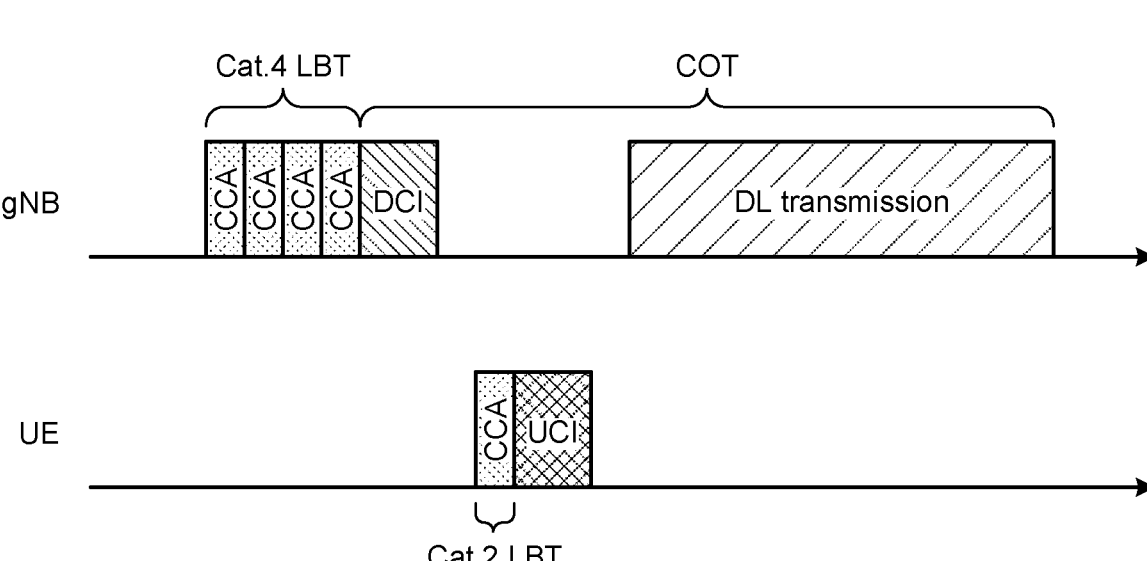
FIG. 6 is a diagram illustrating an example of a process of receiver assisted LBT according to a proposed technology of the present disclosure.

FIG. 6 is a diagram illustrating an example of a process of receiver assisted LBT according to a proposed technology of the present disclosure. FIG. 6 illustrates transmission of data from the base station apparatus 20 (gNB) to the terminal device 40 (UE).

In the example of FIG. 6, the gNB on the transmission side performs LBT of category 4 first, and acquires the transmission opportunity (COT). After acquiring the COT, the gNB transmits the LBT indication to the UE on the reception side by using DCI. The UE performs LBT of category 2 on the basis of an indication from the gNB, and feeds back the LBT result in UCI (uplink control information). The gNB controls subsequent downlink transmission on the basis of the fed back LBT result.

Figure 7:
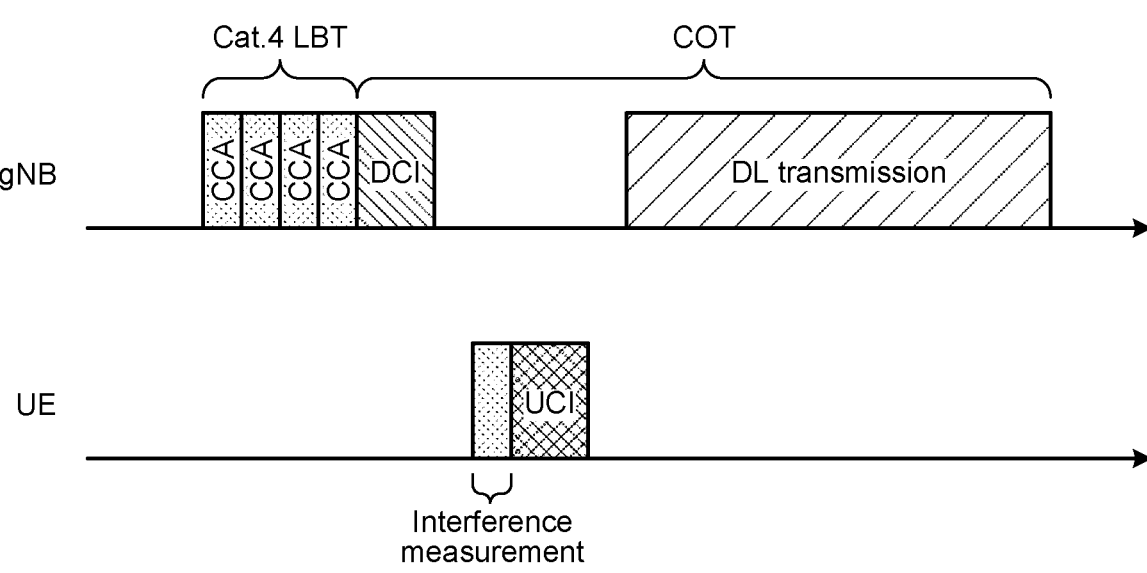
FIG. 7 is a diagram illustrating another example of the process of receiver assisted LBT according to a proposed technology of the present disclosure.

Note that in the receiver assisted LBT, interference measurement and interference information may be fed back, instead of LBT on the reception side. FIG. 7 is a diagram illustrating another example of the process of receiver assisted LBT according to a proposed technology of the present disclosure. As illustrated in FIG. 7, UE measures interference instead of LBT and feeds back, in UCI, a measurement result to gNB.

Here, information fed back as the UCI from the reception side to the transmission side is information about interference (hereinafter, also referred to as interference information) used for receiver assisted LBT. Such interference information is information that can be multiplexed with other UCI (e.g., HARQ-ACK, CSI, and SR). In other words, the interference information may be multiplexed with other information and fed back as UCI to the transmission side.

In addition, the interference information preferably has a shorter processing time than that of other UCI (e.g., HARQ-ACK and CSI). Therefore, the UE can more readily perform measurement and feedback in the same COT, and can more effectively achieve the receiver assisted LBT.

In addition, when the interference information multiplexed with other UCI is transmitted, UE is allowed to reduce physical resources used for the feedback, which is effective from the viewpoint of improving resource use efficiency and suppressing transmission power. On the other hand, when the interference not multiplexed with other UCI is transmitted, UE is allowed to generate a feedback signal with the interference information alone, which is effective from the viewpoint of processing time. In other words, this configuration makes it possible for UE to feed back the interference information to gNB more promptly.

EXEMPLARY CONFIGURATIONS

Exemplary Configuration of Base Station Apparatus

Figure 8:
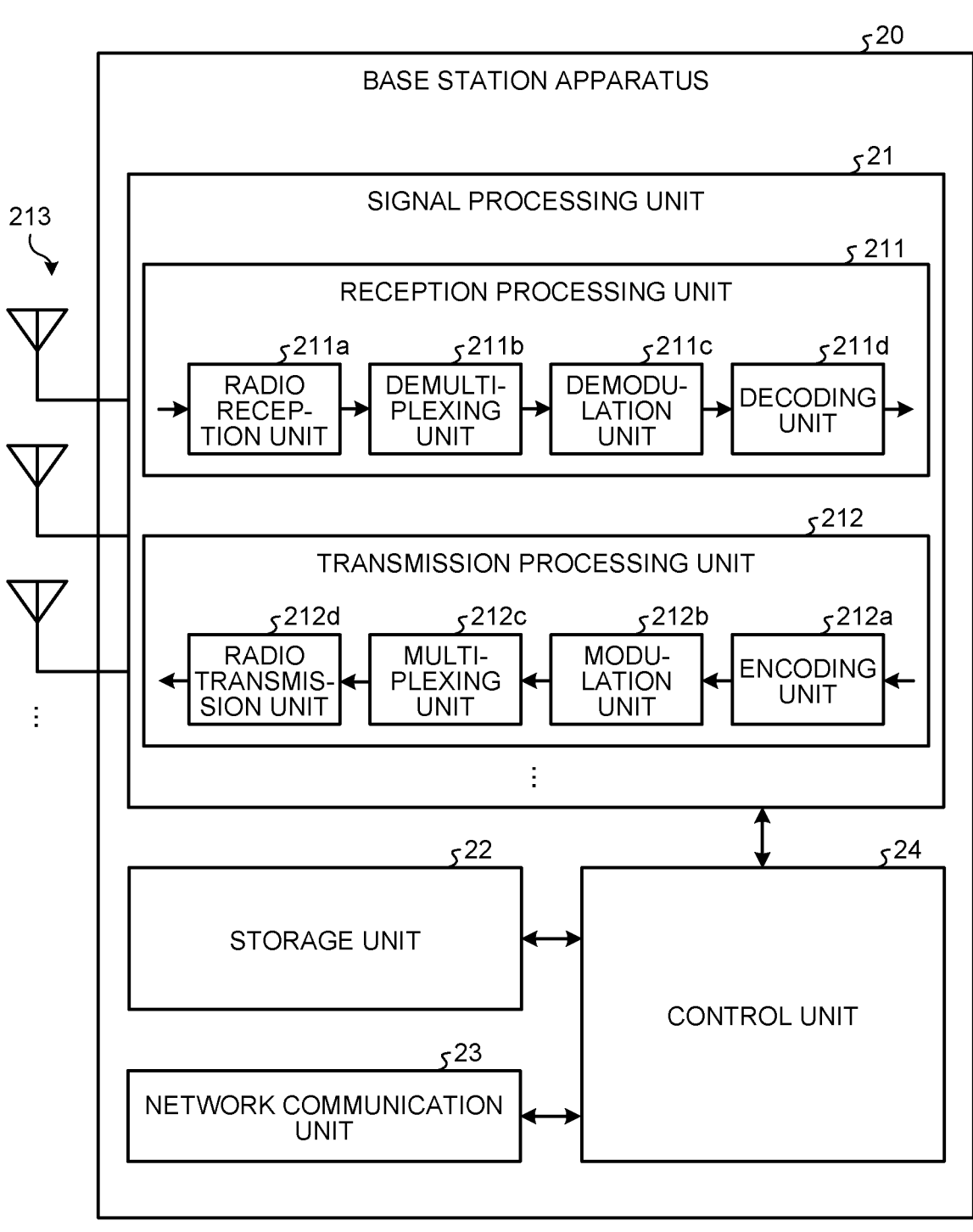
FIG. 8 is a diagram illustrating an exemplary configuration of a base station apparatus according to an embodiment of the present disclosure.

Next, a configuration of the base station apparatus 20 will be described. FIG. 8 is a diagram illustrating an exemplary configuration of the base station apparatus 20 according to an embodiment of the present disclosure. The base station apparatus 20 is a communication device (radio system) that wirelessly communicates with the terminal device 40. The base station apparatus 20 is a type of information processing device.

The base station apparatus 20 includes a signal processing unit 21, a storage unit 22, a network communication unit 23, and a control unit 24. Note that the configuration illustrated in FIG. 8 represents a functional configuration, and a hardware configuration may be different from the functional configuration. Furthermore, the functions of the base station apparatus 20 may be distributed in a plurality of physically separated devices for implementation.

The signal processing unit 21 is a wireless communication interface that wirelessly communicates with other communication devices (e.g., the terminal device 40 and another base station apparatus 20). The signal processing unit 21 is a wireless transceiver that operates under the control of the control unit 24. Note that the signal processing unit 21 may support a plurality of radio access systems. For example, the signal processing unit 21 may support both of NR and LTE. The signal processing unit 21 may support another cellular communication system such as W-CDMA or cdma2000. Furthermore, the signal processing unit 21 may support a wireless LAN communication system in addition to the cellular communication system. As a matter of course, the signal processing unit 21 may only correspond to one radio access system.

The signal processing unit 21 includes a reception processing unit 211, a transmission processing unit 212, and an antenna 413. The signal processing unit 21 may include a plurality of the reception processing units 211, transmission processing units 212, and antennas 413. Note that when the signal processing unit 21 supports the plurality of radio access systems, the units of the signal processing unit 21 can be individually configured for each of the radio access systems. For example, when the base station apparatus 20 supports NR and LTE, the reception processing units 211 and the transmission processing units 212 may be configured individually for NR and LTE.

The reception processing unit 211 processes the uplink signal received via the antenna 413. The reception processing unit 211 includes a radio reception unit 211a, a demultiplexing unit 211b, a demodulation unit 211c, and a decoding unit 211d.

The radio reception unit 211a performs, on the uplink signal, down conversion, removal of an unnecessary frequency component, control of an amplification level, quadrature demodulation, conversion to a digital signal, removal of a guard interval, and extraction of a frequency domain signal by fast Fourier transform, or the like. For example, it is assumed that the radio access system of the base station apparatus 20 is a cellular communication system such as LTE. At this time, the demultiplexing unit 211b demultiplexes an uplink channel, such as a physical uplink shared channel (PUSCH) and physical uplink control channel (PUCCH), and an uplink reference signal, from a signal output from the radio reception unit 211a. The demodulation unit 211c applies a modulation method such as binary phase shift keying (BPSK) or quadrature phase shift keying (QPSK) to a modulated symbol in the uplink channel to demodulate the received signal. The modulation method used by the demodulation unit 211c may employ multi-level QAM such as 16 quadrature amplitude modulation (QAM), 64QAM, or 256QAM. The decoding unit 211d performs decoding processing on encoded bits in the uplink channel demodulated. Decoded uplink data and uplink control information are output to the control unit 24.

The transmission processing unit 212 performs transmission processing for downlink control information and downlink data. The transmission processing unit 212 includes an encoding unit 212a, a modulation unit 212b, a multiplexing unit 212c, and a radio transmission unit 212d.

The encoding unit 212a performs encoding of the downlink control information and the downlink data that are input from the control unit 24, by using an encoding method such as block coding, convolutional coding, or turbo coding. The modulation unit 212b modulates encoded bits output from the encoding unit 212a by using a predetermined modulation method such as BPSK, QPSK, 16QAM, 64QAM, or 256QAM. The multiplexing unit 212c allocates a modulated symbol and a downlink reference signal that are multiplexed for each channel, in a predetermined resource element. The radio transmission unit 212d performs various types of signal processing on a signal from the multiplexing unit 212c. For example, the radio transmission unit 212d performs processing such as conversion to the time domain by using fast Fourier transform, addition of the guard interval, generation of a baseband digital signal, conversion to an analog signal, quadrature modulation, up-conversion, removal of an unnecessary frequency component, and amplification of power. A signal generated by the transmission processing unit 212 is transmitted from the antenna 413.

The storage unit 22 is a data readable/writable storage device such as DRAM, SRAM, a flash memory, or hard disk. The storage unit 22 functions as storage means of the base station apparatus 20.

The network communication unit 23 is a communication interface for communication with another device (e.g., another base station apparatus 20). For example, the network communication unit 23 is a local area network (LAN) interface such as a network interface card (NIC). The network communication unit 23 may be a universal serial bus (USB) interface including a USB host controller, a USB port, and the like. Furthermore, the network communication unit 23 may be a wired interface or a wireless interface. The network communication unit 23 functions as network communication means of the base station apparatus 20. The network communication unit 23 communicates with the another device under the control of the control unit 24.

The control unit 24 is a controller that controls each unit of the base station apparatus 20. The control unit 24 is implemented by a processor such as a Central Processing Unit (CPU) or a Micro Processing Unit (MPU). For example, the control unit 24 is implemented by executing various programs stored in the storage device in the base station apparatus 20 by the processor, with a random access memory (RAM) or the like as a working area. In addition, the control unit 24 may be implemented by an integrated circuit such as an application specific integrated circuit (ASIC) or a field programmable gate array (FPGA). The CPU, MPU, ASIC, and FPGA can all be regarded as the controllers.

Exemplary Configuration of Terminal Device

Figure 9:
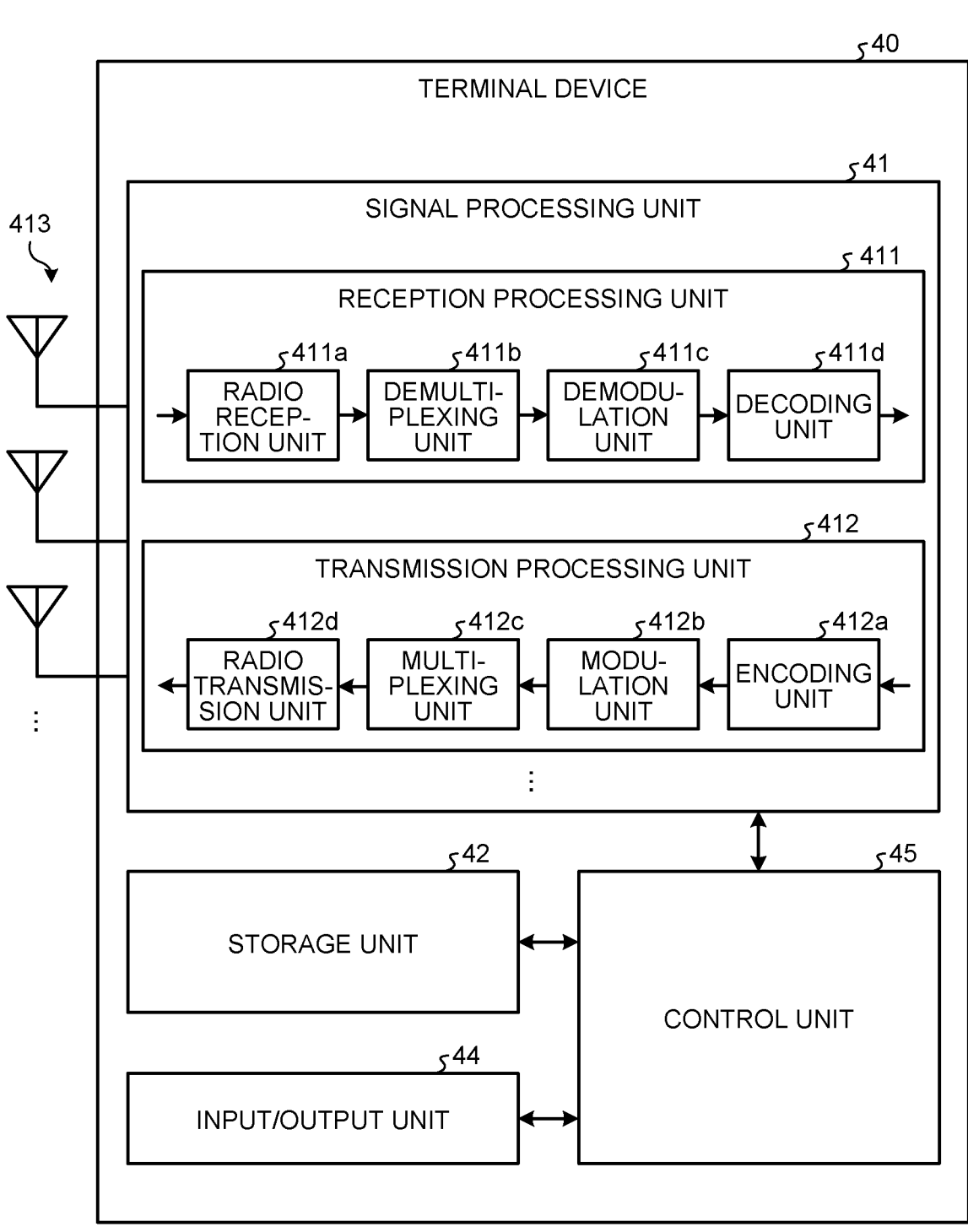
FIG. 9 is a diagram illustrating an exemplary configuration of a terminal device according to an embodiment of the present disclosure.

Next, a configuration of the terminal device 40 will be described. FIG. 9 is a diagram illustrating an exemplary configuration of the terminal device 40 according to an embodiment of the present disclosure. The terminal device 40 is a communication device (radio system) that wirelessly communicates with the base station apparatus 20. Furthermore, the terminal device 40 is a type of information processing device.

The terminal device 40 includes a signal processing unit 41, a storage unit 42, an input/output unit 44, and a control unit 45. Note that the configuration illustrated in FIG. 9 represents a functional configuration, and a hardware configuration may be different from the functional configuration. Furthermore, the functions of the terminal device 40 may be distributed in a plurality of physically separated configurations for implementation.

The signal processing unit 41 is a wireless communication interface that wirelessly communicates with other communication devices (e.g., the base station apparatus 20 and another terminal device 40). The signal processing unit 41 is a wireless transceiver that operates under the control of the control unit 45. The signal processing unit 41 supports one or more radio access systems. For example, the signal processing unit 41 supports both of NR and LTE. The signal processing unit 41 may support another radio access system such as W-CDMA or cdma2000.

The signal processing unit 41 includes a reception processing unit 411, a transmission processing unit 412, and an antenna 313. The signal processing unit 41 may include a plurality of the reception processing units 411, transmission processing units 412, and antennas 313. Note that when the signal processing unit 41 supports the plurality of radio access systems, the units of the signal processing unit 41 can be individually configured for each of the radio access systems. For example, the reception processing units 411 and the transmission processing units 412 may be configured individually for LTE and NR. The configurations of the reception processing unit 411 and the transmission processing unit 412 are similar to those of the reception processing units 211 and the transmission processing units 212 of the base station apparatus 20.

The storage unit 42 is a data readable/writable storage device such as DRAM, SRAM, a flash memory, or hard disk. The storage unit 42 functions as storage means of the terminal device 40.

The input/output unit 44 is a user interface for exchanging information with the user. For example, the input/output unit 44 is an operation device, such as a keyboard, mouse, operation keys, or touch screen, through which various operations are performed by the user. Alternately, the input/output unit 44 is a display device such as a liquid crystal display or organic electroluminescence (EL) display. The input/output unit 44 may be an acoustic device such as a speaker or buzzer. Furthermore, the input/output unit 44 may be a lighting device such as a light emitting diode (LED) lamp. The input/output unit 44 functions as input/output means (input means, output means, operation means, or reporting means) of the terminal device 40.

The control unit 45 is a controller that controls each unit of the terminal device 40. The control unit 45 is implemented by a processor such as CPU or MPU. For example, the control unit 45 is implemented by executing various programs stored in the storage device in the terminal device 40 by the processor, with RAM or the like as a working area. Note that the control unit 45 may be implemented by an integrated circuit such as ASIC or FPGA. The CPU, MPU, ASIC, and FPGA can all be regarded as the controllers.

TECHNICAL FEATURES

Indication of Receiver Assisted LBT

In receiver assisted LBT, measurement of interference used for the receiver assisted LBT is indicated from the base station apparatus 20 to the terminal device 40. The terminal device 40 receiving the indication of receiver assisted LBT performs the measurement of interference for the receiver assisted LBT and feeds back the measured interference to the base station apparatus 20.

An example of the indication of receiver assisted LBT includes downlink control information (DCI). The indication of receiver assisted LBT may be an indication related to the measurement of interference or an indication of feedback of information about the measured interference.

In this case, as a specific example of the indication of receiver assisted LBT, DCI (e.g., DCI format 0, DCI format 1) specific to the terminal device 40 is assumed. As the indication of receiver assisted LBT, the indication of the LBT may be explicitly reported, or may be reported in association with other information (e.g., ChannelAccess-CPext, ChannelAccess-CPext-CAPC, CSI request, ZP CSI-RS trigger).

A specific example of the indication of receiver assisted LBT includes an aperiodic CSI trigger (CSI request) included in the downlink grant (DCI format 1).

As another specific example of the indication of receiver assisted LBT, group common DCI for the terminal devices 40 (e.g., DCI format 2) is assumed. The receiver assisted LBT is indicated to one or more terminal devices 40 through the group common DCI for the terminal devices 40. The base station apparatus 20 may give an indication to all the terminal devices 40 by using one piece of information included in the group common DCI for the terminal devices 40. Alternatively, the base station apparatus 20 may give an indication to each terminal device 40 by using a plurality of bits included in the group common DCI for the terminal devices 40. The indication of receiver assisted LBT is preferably reported together with information (COT duration indicator) indicating the COT length.

Note that even when the receiver assisted LBT is indicated in DCI, the terminal device 40 may not perform the receiver assisted LBT when there is no valid measurement resource or feedback resource. In other words, the terminal device 40 can ignore the indication in DCI. Here, examples of no valid measurement resource or feedback resource include no measurement resource or feedback resource in the same COT, indication of the performance of measurement or feedback at timing shorter than the processing time, and the like.

Furthermore, another example of the indication of receiver assisted LBT includes medium access control (MAC) control element (CE) or radio resource control (RRC). The receiver assisted LBT is indicated semi-statically by MAC CE or RRC.

In this configuration, a specific example of the indication of receiver assisted LBT includes dedicated RRC signaling (e.g., RRCSetup message and RRCReconfiguration message). Use of the dedicated RRC signaling enables setting for individual terminals. This configuration allows an operation such as setting the receiver assisted LBT only to the terminal device 40 at the cell edge having a large influence of the hidden node and not setting the receiver assisted LBT to the terminal device 40 at the cell center, and the system efficiency is improved.

In addition, a specific example of the indication of receiver assisted LBT includes system information (MIB and SIB). In this example, the system information includes information indicating performance of the receiver assisted LBT. The terminal device 40 that has received the information performs receiver assisted LBT in all COTs. Note that the indication of receiver assisted LBT reported in the system information may be overwritten with dedicated RRC signaling or DCI.

Information about Interference Used for Receiver Assisted LBT

The information about interference (hereinafter, also referred to as assist interference information) used for receiver assisted LBT will be described in detail below.

The assist interference information is information about interference measured in the same COT as COT in which the feedback is performed, and is transmitted as UCI. The assist interference information may be defined as part of CSI, or may be defined as a UCI type different from those of HARQ-ACK, CSI, SR, and the like. When the assist interference information is defined as part of CSI, for example, the assist interference information may be defined as CSI Part 3.

The assist interference information is preferably defined to have a processing time shorter than that of other UCI types (HARQ-ACK and CSI). Therefore, measurement and feedback are readily performed in the same COT.

Contents of Assist Interference Information

An example of the content of the assist interference information will be provided below.

An example of the contents of the assist interference information includes information (LBT result) indicating a result of LBT. The terminal device 40 that has received an indication of LBT from the base station apparatus 20 performs LBT and feeds back the LBT result (clear or busy) as 1-bit information.

Another example of the contents of the assist interference information includes information indicating an amount of interference. For example, the information is obtained by quantizing measured interference power value. The quantization width, range, and/or quantization bit rate may be set by an upper layer or may be defined in advance.

Another example of the contents of the assist interference information includes a received signal strength indicator (RSSI). The number of bits of the information of RSSI used for receiver assisted LBT is preferably smaller than the number of bits of the information of RSSI (e.g., L1-RSSI and L3-RSSI) used for other purposes. Limitation of an amount of information fed back can reduce a calculation processing load and the processing time.

Another example of the contents of the assist interference information includes a channel quality indicator (CQI). In particular, CQI used for receiver assisted LBT is preferably wide-band CQI. The number of bits of the information of CQI used for receiver assisted LBT is preferably smaller than the number of bits of the information of CQI used for other purposes. In a specific example, CQI used for other purposes is 4 bits, and CQI used for receiver assisted LBT is 2 bits. Limitation of the amount of information fed back can reduce the calculation processing load and the processing time.

Another example of the contents of the assist interference information includes reference signal received quality (RSRQ). The number of bits of the information of RSRQ used for receiver assisted LBT is preferably smaller than the number of bits of the information of RSRQ (e.g., L3-RSRQ) used for other purposes. Limitation of the amount of information fed back can reduce the calculation processing load and the processing time.

Another example of the contents of the assist interference information includes a signal to interference plus noise ratio (SINR). The number of bits of the information of SINR used for receiver assisted LBT is preferably smaller than the number of bits of the information of SINR (e.g., L1-SINR and L3-SINR) used for other purposes. In a specific example, L1-SINR used for other purposes is 7 bits, and SINR used for receiver assisted LBT is 4 bits. Limitation of the amount of information fed back can reduce the calculation processing load and the processing time.

Note that another example of the contents of the assist interference information may be regarded as a decoding result of PDCCH. Feedback of the assist interference information may be regarded as successful decoding of PDCCH, and feedback of no assist interference information may be regarded as failure in decoding of PDCCH.

Interference Measurement Resources Used for Receiver Assisted LBT

Interference measurement resources for receive assist LBT will be described in detail below. Details of the resources used for measurement of interference by the terminal device 40 will be described, for the receiver assisted LBT.

In on example, interference measurement timing in receiver assisted LBT is determined by DCI (downlink grant) for scheduling PDSCH. In a specific example, the interference measurement timing included in DCI is specified in a dedicated field (e.g. PDCCH-to-LBT_result measurement timing) provided for timing specification. Therefore, the interference measurement timing is explicitly specified in DCI separately from other information.

Note that, in this example, an offset from DCI to the interference measurement timing is set to be shorter than a gap (k0) between a rear symbol of PDCCH and a start symbol of PDSCH. When the processing time required for calculation and feedback of interference used for receiver assisted LBT is longer than k0, the measurement of interference is not performed.

In another example, the interference measurement timing in receiver assisted LBT is determined according to DCI reception timing. For example, the interference measurement timing in receiver assisted LBT is a downlink symbol or a flexible symbol after a predetermined offset from the received DCI.

In another example, the interference measurement timing in receiver assisted LBT is immediately before the feedback timing of the assist interference information. For example, the terminal device 40 measures the interference power in a CCA slot immediately before the feedback timing of the assist interference information.

In another example, the interference measurement timing in receiver assisted LBT is any timing between the reception of DCI including the indication of receiver assisted LBT and the feedback of the assist interference information.

In another example, the interference measurement timing in receiver assisted LBT is any timing between the start of COT and the feedback timing of the assist interference information.

In another example, the interference measurement timing in receiver assisted LBT is timing of a CSI-IM resource, NZP-CSI-RS, or ZP-CSI-RS resource. For example, the interference information used for the receiver assisted LBT is measured using an aperiodic CSI-IM resource or aperiodic NZP-CSI-RS resource immediately after PDCCH reception timing. For example, the interference information used for the receiver assisted LBT is measured using the aperiodic CSI-IM resource or the aperiodic NZP-CSI-RS resource, immediately before timing at which the interference information used for the receiver assisted LBT is fed back.

In another example, the interference measurement timing in receiver assisted LBT is periodic timing set by the base station apparatus 20.

Note that one or a plurality of interference measurement timings may be employed in the receiver assisted LBT. When there are a plurality of interference measurement timings, pieces of the interference information measured with the timings may be averaged and fed back as one piece of information, or the pieces of information may be individually fed back.

Note that the interference measurement timing in receiver assisted LBT is in the same COT as the COT for feeding back the assist interference information. In other words, the interference measurement timing in receiver assisted LBT is not specified (set) in COT different from the COT for feeding back the assist interference information.

When the interference measurement timing in receiver assisted LBT is in a measurement gap, the interference measurement of the receiver assisted LBT may not be performed.

Note that when the measurement of interference cannot be performed at any of the timings described above, the terminal device 40 may not feed back the assist interference information. Alternatively, when the measurement of interference cannot be performed at any of the timings described above, the terminal device 40 may feed back invalid assist interference information. Alternatively, when the measurement of interference cannot be performed at any of the timings described above, the terminal device 40 may feed back that the measurement of interference cannot be performed.

Feedback Timing of the Assist Interference Information

Details of the feedback timing of the assist interference information will be described below.

In another specific example, the feedback timing of the assist interference information is specified in DCI. For example, a dedicated field (e.g. PDCCH-to-LBT_result feedback timing) for specifying the feedback timing of the assist interference information is provided so that the timing is explicitly specified separately from other information. Note that, in this example, an offset from DCI to the feedback timing is set to be shorter than the gap (k0) between the rear symbol of the PDCCH and the start symbol of the PDSCH. When the processing time required for the calculation of interference used for receiver assisted LBT and the feedback of the assist interference information is longer than k0, feedback is not performed.

In another specific example, the feedback timing of the assist interference information is specified on the basis of scheduled PDSCH timing. For example, the feedback timing of the assist interference information is an uplink resource (uplink symbol) immediately before scheduled PDSCH. Note that when there is no uplink resource after a processing time of the assist interference information from the DCI reception timing, feedback is not performed.

In another specific example, the feedback timing of the assist interference information is specified on the basis of the PDCCH (DCI) reception timing. For example, the feedback timing of the assist interference information is the nearest uplink resource (uplink symbol) from the PDCCH (DCI) reception timing. Note that when there is no uplink resource after a processing time of the assist interference information from the DCI reception timing, feedback is not performed.

In another specific example, the feedback timing of the assist interference information is a PUCCH resource corresponding to the PDCCH monitoring occasion. When the DCI indicating receiver assisted LBT is detected in the PDCCH monitoring occasion, the assist interference information is fed back in the PUCCH resource associated with the PDCCH monitoring occasion. Note that when the DCI instructing the receiver assisted LBT is not detected in the PDCCH monitoring occasion, nothing needs to be transmitted in the PUCCH resource.

In another specific example, the feedback timing of the assist interference information is periodically configured PUCCH resources. When the DCI indicating receiver assisted LBT is detected, the nearest PUCCH resource after the processing time has elapsed from the end of the last symbol of the detected PDCCH is used, from periodically set PUCCH resources.

Note that, when the nearest PUCCH resource and PDCCH and/or the measurement timing are not in the same COT, the assist interference information is not effectively used, and thus the assist interference information may not be fed back.

Note that when a COT length remaining after the timing of feedback is shorter than a predetermined value, the assist interference information is not effectively used, and thus the assist interference information may not be fed back.

Interference Measurement Bandwidth Used for Receiver Assisted LBT

An interference measurement bandwidth used for receiver assisted LBT will be described below.

In an example, the interference measurement bandwidth used for receiver assisted LBT is an LBT bandwidth. The LBT bandwidth is defined as the unit of bandwidth in which LBT is performed. The LBT bandwidth may be the same as a bandwidth of a channel on which an operation is performed, or may be different from the bandwidth of the channel. For example, a plurality of channels continuous in frequency may be bundled into one LBT bandwidth.

In another example, the interference measurement bandwidth used for receiver assisted LBT is defined in PRB to which PDSCH is allocated. For example, the width between the lowest frequency and the highest frequency of the allocated PDSCH is defined as the interference measurement bandwidth. Furthermore, for example, interference is measured only in PRB of the allocated PDSCH, and no interference is measured or considered in PRB to which PDSCH is not allocated.

In another example, the interference measurement bandwidth used for receiver assisted LBT is the same as a downlink bandwidth part (BWP). For example, the interference measurement bandwidth used for receiver assisted LBT is an active downlink BWP. Note that the interference measurement bandwidth used for receiver assisted LBT may be an initial downlink BWP or may be a default downlink BWP.

In another example, the interference measurement bandwidth used for receiver assisted LBT is a bandwidth specified by RRC signaling. For example, the RRC signaling specifies the upper limit and the lower limit of the band used for measurement of interference used for receiver assisted LBT.

Note that a plurality of interference measurement bands used for receiver assisted LBT may be set on the frequency axis. When a plurality of measurement bands is set on the frequency axis, the terminal device 40 measures interference in each of the plurality of measurement bands. In this configuration, the terminal device 40 may individually feed back the interference information of the plurality of measurement bands, or may feed back one piece of interference information obtained by averaging (or combining by AND) the interference information of the plurality of measurement bands.

Feedback Method for Assist Interference Information

A feedback method for the assist interference information will be described below.

In an example of the feedback method for the assist interference information, the assist interference information is represented by the presence/absence of transmission of a feedback channel (PUCCH or PUSCH). The transmission of PUCCH or PUSCH in the feedback resource is represented as channel clear, and the transmission of the PUCCH or PUSCH in the feedback resource is expressed as channel busy. This feedback method is also referred to as a first feedback method.

In the first feedback method, only 1-bit information can be represented. In other words, it is difficult to represented information of two or more bits. In other words, it is difficult to multiplex with other UCI (HARQ-ACK, CSI, and SR). Meanwhile, information can be represented by the presence/absence of transmission, and therefore, the processing time can be reduced.

Note that a conventional PUCCH format (PUCCH format 0/1/2/3/4) may be used for the first feedback method. Alternatively, a sounding reference signal (SRS) may be used, or a new uplink physical channel (e.g., PUCCH of PUCCH format 5) may be used.

In another example of the feedback method for the assist interference information, the assist interference information is represented by bits of UCI. This feedback method is also referred to as a second feedback method.

In the second feedback method, information of two bits or more can be represented. Therefore, it is easy to multiplex with other UCI (HARQ-ACK, CSI, and SR). Meanwhile, generation of bits is required, and therefore, the processing time is longer than that in the first feedback method.

In the second feedback method, the assist interference information is preferably carried on PUCCH or PUSCH.

Multiplexing Method for Assist Interference Information

A multiplexing method for the assist interference information will be described below. As described above, in the second feedback method, the assist interference information can be multiplexed with other UCI. Therefore, a multiplexing method for multiplexing the assist interference information with other UCI will be described below.

When the feedback timings of the assist interference information and other UCI overlap, the assist interference information can be multiplexed with the other UCI (HARQ-ACK, CSI, and SR), Here, the case where "the feedback timings of the assist interference information and other UCI overlap" includes, for example, overlapping of a symbol of PUCCH including the assist interference information with all or some (at least some) of the symbols of PUCCH including the other UCI.

When multiplexed with other UCI, the physical resources used for feedback can be reduced, which is effective from the viewpoint of improving resource use efficiency and suppressing transmission power. Meanwhile, when not multiplexed with other UCI, the feedback signal can be generated with the assist interference information alone, which is effective from the viewpoint of the processing time. In other words, when not multiplexed with the other UCI, the terminal device 40 is allowed to feed back the assist interference information to the base station apparatus 20 in a shorter time.

Therefore, multiplexing of the assist interference information and other UCI can be controlled by the base station apparatus 20. Therefore, flexible communication control is enabled, and system efficiency improvement can be expected.

When the feedback timing of the assist interference information and the feedback timing of other UCI overlap, whether to multiplex the assist interference information and the other UCI is determined according to condition.

An example of the condition includes configuration by RRC. When multiplexing is permitted (enable) by RRC signaling, the assist interference information is multiplexed with other UCI, and when multiplexing is not permitted (disable), the assist interference information is not multiplexed with other UCI.

An example of the condition includes an indication by DCI. When multiplexing is indicated by DCI, the assist interference information is multiplexed with other UCI, and when multiplexing is not instructed by DCI, the assist interference information is not multiplexed with other UCI.

Another example of the condition includes the total number of bits of UCI. When the total number of bits of UCI at predetermined feedback timing is smaller than a predetermined value, the assist interference information is multiplexed with other UCI, and when the total number of bits of UCI at the predetermined feedback timing is equal to or larger than the predetermined value, the assist interference information is not multiplexed with other UCI. The predetermined value may be defined in advance or may be set by an upper layer.

Another example of a condition includes a processing time. For example, when transmission of all UCI is prepared before the timing of feeding back the assist interference information, the assist interference information is multiplexed with other UCI, and when transmission of the assist interference information is not prepared, the assist interference information is not multiplexed with other UCI.

Another example of the condition includes the feedback method for the assist interference information used for receiver assisted LBT. When it is specified or determined that the assist interference information used for receiver assisted LBT is transmitted by the second feedback method, the assist interference information is multiplexed with the other UCI. Meanwhile, when it is specified or determined that the assist interference information is transmitted by the first feedback method, the assist interference information is not multiplexed with the other UCI.

Another example of the condition includes transmission power. When transmission power after multiplexing is smaller than a predetermined value, the assist interference information is multiplexed with other UCI, and when the transmission power after multiplexing is equal to or larger the predetermined value, the assist interference information is not multiplexed with other UCI.

Another example of a condition includes a type of uplink physical channel that carries other UCI is transmitted. When the other UCI is transmitted on PUCCH or PUSCH or transmitted on PUSCH without a transport block, the assist interference information is multiplexed with the other UCI, and otherwise, the assist interference information is not multiplexed with the other UCI.

Another example of a condition includes the UCI type. When other UCI is HARQ-ACK and/or SR (i.e., when conventional CSI is not included), the assist interference information is multiplexed with the other UCI, and when other UCI includes the conventional CSI, the assist interference information is not multiplexed with the other UCI.

Another example of a condition includes a priority. When other UCI is high-priority UCI (e.g., PUCCH with a higher priority index), the assist interference information is multiplexed with the other UCI, and when other UCI is low-priority UCI (e.g., PUCCH with a lower priority index), the assist interference information is not multiplexed with the other UCI.

It is assumed that receiver assisted LBT is dynamically specified in DCI when the assist interference information is multiplexed with other UCI. In this case, when the receiver assisted LBT is specified in DCI, the terminal device 40 performs feedback, with the assist interference information in UCI, and when the receiver assisted LBT is not specified, the terminal device 40 performs feedback, without the assist interference information in the UCI. This configuration makes it possible to perform feedback with an appropriate number of bits, improving system efficiency.

Meanwhile, when the receiver assisted LBT is semi-statically specified, it is preferable to always reserve bits indicating the assist interference information in UCI, regardless of whether the receiver assisted LBT has been performed. The bits always reserved in UCI makes it possible to avoid a mismatch in the number of bits between the base station apparatus 20 and the terminal device 40.

For example, when the assist interference information is not multiplexed with other UCI, the assist interference information can be transmitted simultaneously with the other UCI by using an uplink physical channel (PUCCH or PUSCH) different from that carrying the other UCI.

in another example of the assist interference information not multiplexed with other UCI, the assist interference information or the other UCI is not transmitted (dropped). In this example, UCI to be transmitted and UCI to be dropped are determined according to the priority index and the priority of UCI. Examples of the priority of UCI include HARQ-ACK, the information about interference used for receiver assisted LBT, and CSI, in descending order of priority. Therefore, transmission of the information about interference used for receiver assisted LBT in priority to normal CSI enables effective receiver assisted LBT.

Note that even if the information about interference used for receiver assisted LBT is defined as part of CSI (e.g., CSI Part 3), the definition may be different from a conventional CSI rule. Even if it is configured by an upper layer that HARQ-ACK is not multiplexed with CSI by simultaneousHARQ-ACK-CSI, the information about interference can be multiplexed with the HARQ-ACK.

When the feedback timing of the assist interference information and the feedback timing of PUSCH overlap, the assist interference information may be multiplexed on the PUSCH and fed back as part of the PUSCH. In this configuration, transmission can be effectively performed on one uplink physical channel, from the viewpoint of resource use efficiency and transmission power. Meanwhile, when the assist interference information is transmitted in PUSCH, reception probability may decrease depending on coding rate and transmission power density. Therefore, whether to permit multiplexing of the assist interference information on the PUSCH can be controlled by the base station apparatus 20.

when the feedback timing of the assist interference information and the feedback timing of the PUSCH overlap, whether to multiplex the assist interference information on the PUSCH is determined according to condition. As the conditions of whether to perform the multiplexing of the information about interference used for receiver assisted LBT on the PUSCH, conditions similar to those of the multiplexing of the information about interference used for receiver assisted LBT and other UCI can be applied.

Processing Time of Assist Interference Information

The processing time of the assist interference information can be defined similarly to the PDSCH processing time and the CSI computation time. The processing time of the assist interference information is preferably shorter than the CSI computation time.

In a specific example, when the assist interference information is defined as part of CSI, a table of Zs having values smaller than other Zs is defined. For example, a table of CSI computation delay requirement 3 used for feedback of the assist interference information, as illustrated in Table 8, is defined. When a parameter (e.g., LBT_result) indicating the feedback of the information about interference used for receiver assisted LBT is set to ReportQuantity, $Z_1$ and $Z'_1$ of Table 8 are referenced to, and the CSI computation time is calculated.

TABLE 8

CSI COMPUTATION DELAY REQUIREMENT 3

| μ | $Z_1$ [symbols] | |
| --- | --- | --- |
| | $Z_1$ | $Z'_1$ |
| 0 | 5 | 4 |
| 1 | 7 | 5 |
| 2 | 12 | 10 |
| 3 | 21 | 15 |
| 4 | 40 | 30 |
| 5 | 80 | 60 |
| 6 | 160 | 120 |

In another specific example, when the assist interference information is defined separately from CSI, for example, a PDCCH processing time (e.g., $N_3$) is defined instead of PDSCH processing time $N_1$. The PDCCH processing time is shorter than the PDSCH processing time. Processing time $T_{proc, 3}$ of the assist interference information is calculated from the following Formula (6) and the values in Table 9.

$$T_{proc,3} = N_3 (2048 + 144) \cdot \kappa 2^{-\mu} \cdot T_C + T_{ext} \quad (6)$$

TABLE 9

PDCCH PROCESSING TIME

| μ | PDCCH decoding time $N_3$ [symbols] |
| --- | --- |
| 0 | 2 |
| 1 | 3 |
| 2 | 6 |
| 3 | 9 |
| 4 | 16 |
| 5 | 32 |
| 6 | 64 |

In an example, furthermore, the processing time of the assist interference information can be determined according to the feedback method. Specifically, the first feedback method has a processing time smaller than that of the second feedback method.

In a specific example, when the assist interference information is defined as part of CSI, Table 10 is referenced to if the first feedback method is applied, and Table 8 is referenced to if the second feedback method is applied.

TABLE 10

CSI COMPUTATION DELAY REQUIREMENT 4

| μ | $Z_1$ [symbols] | |
| --- | --- | --- |
| | $Z_1$ | $Z'_1$ |
| 0 | 3 | 2 |
| 1 | 4 | 3 |
| 2 | 6 | 5 |
| 3 | 10 | 8 |

TABLE 10-continued

CSI COMPUTATION DELAY REQUIREMENT 4

| μ | $Z_1$ [symbols] | |
| --- | --- | --- |
| | $Z_1$ | $Z'_1$ |
| 4 | 20 | 15 |
| 5 | 40 | 30 |
| 6 | 80 | 60 |

In a specific example, when the assist interference information is defined separately from CSI, Table 11 is referenced to if the first feedback method is applied, and Table 9 is referenced to if the second feedback method is applied.

TABLE 11

PDCCH PROCESSING TIME 2

| μ | PDCCH decoding time $N_3$ [symbols] |
| --- | --- |
| 0 | 1 |
| 1 | 2 |
| 2 | 3 |
| 3 | 5 |
| 4 | 8 |
| 5 | 16 |
| 6 | 32 |

In an example, the processing time of the assist interference information is further determined according to multiplexing with other UCI or on PUSCH. In a specific example, when multiplexed with other UCI, a processing time of the other UCI is applied. For example, when information of other CSI is included, other CSI computation time is applied. Specifically, when multiplexed on PUSCH, the PUSCH processing time is applied.

In another example, the processing time of the assist interference information is determined according to the number of information bits. Specifically, when the number of bits of UCI including the assist interference information is 1, a shorter processing time (e.g., the processing time of the first feedback method) is applied, and when the number of bits of UCI including the assist interference information is 2, a longer processing time (e.g., the second feedback method) is applied.

In another example, the processing time of the assist interference information is determined according to a detection symbol of PDCCH.

In another example, the processing time of the assist interference information is determined according to an interference measurement method.

The processing time of the assist interference information is finely defined according to the conditions, the base station apparatus 20 can set an appropriate feedback timing for the terminal device 40.

Operations of Base Station Apparatus in Receiver Assisted LBT

Figure 10:
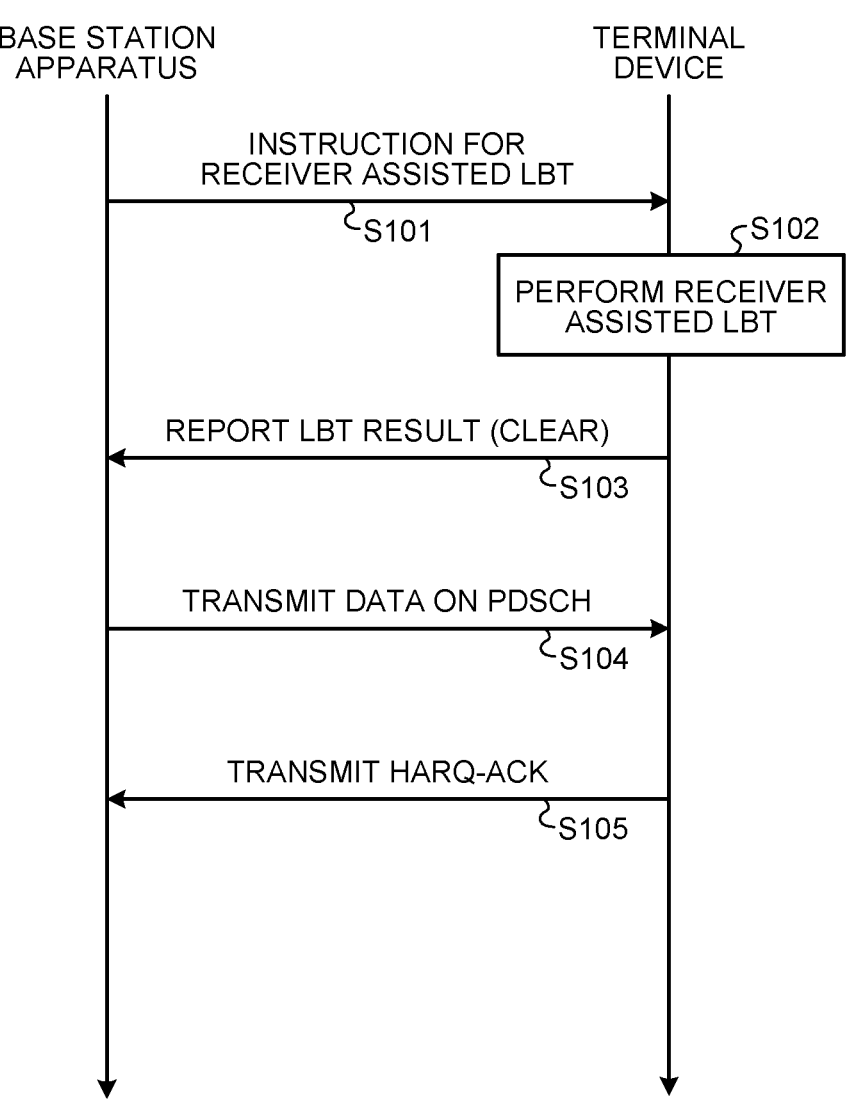
FIG. 10 is a diagram illustrating an example of a communication process in the communication system according to an embodiment of the present disclosure.

Here, an example of the operations of the base station apparatus 20 in receiver assisted LBT will be described with reference to FIG. 10. FIG. 10 is a diagram illustrating an example of a communication process in the communication system 1 according to an embodiment of the present disclosure. Here, it is assumed that a result of receiver assisted LBT by the terminal device 40 is clear.

As illustrated in FIG. 10, for example, the base station apparatus 20 instructs the terminal device 40 to perform receiver assisted LBT (Step S101). Such an instruction is given using, for example, DCI.

The terminal device 40 that has received the instruction of receiver assisted LBT performs the receiver assisted LBT in the same COT as COT in which the instruction is received (Step S102), and the LBT result is reported to the base station apparatus 20 in the same COT (Step S103). For example, the LBT result is reported to the terminal device 40, in UCI.

The base station apparatus 20 that has determined, from the received LBT result, that the amount of interference of the terminal device 40 is equal to or smaller than a predetermined value (clear) transmits download (DL) data on PDSCH (Step S104). The terminal device 40 transmits HARQ-ACK indicating a result of reception of the DL data to the base station apparatus 20 (Step S105).

As described above, in the receiver assisted LBT, the base station apparatus 20 receives, for example, the LBT result as the information about interference (assist interference information) from the terminal device 40. When it is determined that the amount of interference of the terminal device 40 is equal to or smaller than the predetermined value on the basis of the assist interference information, the base station apparatus 20 transmits a downlink physical signal/physical channel to the terminal device 40.

Meanwhile, when it is determined that the amount of interference of the terminal device is equal to or larger than the predetermined value, the base station apparatus performs a predetermined operation. Hereinafter, the operations of the base station apparatus when it is determined that the amount of interference of the terminal device is equal to or larger than the predetermined value will be described.

Figure 11:
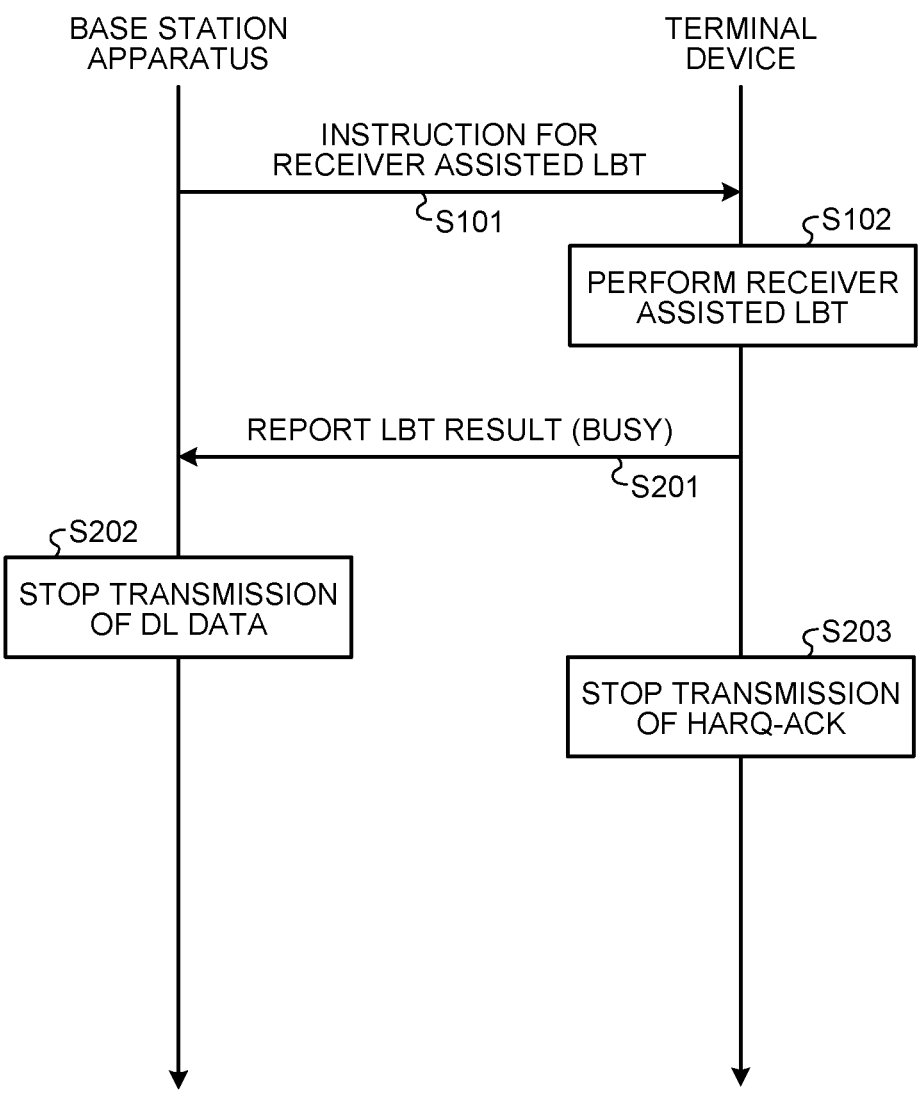
FIG. 11 is a diagram illustrating another example of a communication process in the communication system according to an embodiment of the present disclosure.

FIG. 11 is a diagram illustrating another example of a communication process in the communication system 1 according to an embodiment of the present disclosure. Note that processing before the terminal device 40 performs receiver assisted LBT in Step S102 is the same as that of the communication process illustrated in FIG. 10.

The terminal device 40 reports the LBT result indicating busy (e.g., indicating that the amount of interference of the terminal device 40 is larger than the predetermined value) to the base station apparatus 20, in the same COT as the COT in which the instruction for the receiver assisted LBT is received (Step S201).

Upon receiving the LBT result indicating busy, the base station apparatus 20 stops the DL data (Step S202). In other words, the base station apparatus 20 does not transmit the DL data to the terminal device 40.

Therefore, the terminal device 40 does not receive the DL data on PDSCH. However, as described above, the terminal device 40 reports the LBT result indicating busy to the base station apparatus 20, in Step S201, and therefore, the terminal device 40 stops transmission of HARQ-ACK (Step S203). As described above, the terminal device 40 having reported the LBT result indicating busy to the base station apparatus 20 does not transmit the HARQ-ACK regardless of whether the DL data is received.

As described above, in an example of the operations of the base station apparatus 20, the base station apparatus 20 stops the transmission of the downlink physical signal/physical channel in the COT. At this time, the base station apparatus 20 releases the acquired COT.

In another example of the operations of the base station apparatus 20 when the LTB result is busy, the base station apparatus 20 does not transmit a downlink physical channel to the terminal device 40, the LTB result of which is busy in the COT. Meanwhile, the base station apparatus 20 can transmit the downlink physical channel, downlink physical signal, and broadcast signal, to another terminal device 40 (e.g., a terminal device 40, the LTB result of which is clear) in the COT.

Note that it is assumed that the terminal device 40 does not transmit PDSCH even if the PDSCH is scheduled in advance in the COT in which the feedback is performed, when the base station apparatus 20 does not transmit the downlink physical channel to the terminal device 40. Furthermore, as described above, the terminal device 40 preferably does not transmit HARQ-ACK for the PDSCH that has not been transmitted.

In another example of the operation of the base station apparatus 20 when the LTB result is busy, the base station apparatus 20 transmits the downlink physical channel to the terminal device 40 by using MCS lower than scheduled MCS.

Note that even if the base station apparatus 20 does not transmit the downlink physical channel on the basis of the receiver assisted LBT, the contention window is not updated.

Feedback Channel for Information about
Interference Used for Receiver Assisted LBT The assist interference information including the LBT result measured by the terminal device 40 is included in PUCCH or PUSCH and fed back to the base station apparatus 20.

The assist interference information is fed back by using PUCCH format 0/1/2/3/4. In particular, when UCI including the assist interference information is 1 or 2 bits, PUCCH format 0 or PUCCH format 1 can be applied.

Note that a new PUCCH format (e.g., PUCCH format 5) for feeding back the assist interference information may be defined.

An example of the new PUCCH format includes PUCCH including an orthogonal/scrambling sequence associated with identifiers (UE ID, C-RNTI, etc.) for distinction of the terminal devices 40. The terminal devices 40 each generate the orthogonal/scrambling sequence on the basis of the identifier of its own. The base station apparatus 20 detects the orthogonal/scrambling sequence of the PUCCH to detect transmission from the terminal device 40. Meanwhile, when no orthogonal/scrambling sequence of the PUCCH can detected, it is recognized that transmission from the terminal device 40 corresponding to the sequence has not been performed. Therefore, a plurality of the terminal devices 40 can readily share the PUCCH resource, improving resource use efficiency. The first feedback method is preferably applied to this PUCCH format.

Priority of Assist Interference Information

Priority may be set to the assist interference information. The priority index may be set to the assist interference information.

In an example, a high priority (i.e., the priority index is 0) is always set for the priority of the assist interference information. In this case, for example, when UCI including the assist interference information collides with UCI of priority index 1, the UCI having a priority index 1 is dropped. In addition, the UCI including the assist interference information is not multiplexed with the UCI having the priority index 1. Therefore, fast feedback of the assist interference information can be achieved.

In another example of the priority of the assist interference information, the priority (priority index) is specified in DCI. The field of the priority index included in the DCI specifies the priority of UCI including the assist interference information.

In another example of the priority of the assist interference information, the priority (priority index) is specified by an upper layer (RRC signaling). For example, the priority of the UCI including the assist interference information is specified by a predetermined RRC parameter (e.g. priority-IndexLBT_result).

Transmission Power for UCI Including Assist Interference Information

The transmit power for the uplink physical channel that carries UCI is determined in consideration of the number of bits of UCI. The elements related to the number of bits of UCI include $\Delta_{TF}$ and BPRE.

$\Delta_{TF}$ including no assist interference information in PUCCH transmission of PUCCH format 2, 3, or 4 with 11 bits or less of UCI is calculated by the following Formula (7).

$$\Delta_{TB,b,f,c}(i) = 10 \log_{10}\left(K_1\left(n_{HARQ-ACK}(i) + O_{SR}(i) + O_{CSI}(i)\right)/N_{RE}(i)\right)$$

Where $n_{HARQ-ACK}$ is the number of bits of HARQ-ACK information, $O_{SR}$ is the number of bits of SR information, and $O_{CSI}$ is the number of bits of CSI information.

Meanwhile, $\Delta_{TF}$ including the assist interference information in PUCCH transmission of PUCCH format 2, 3, or 4 with 11 bits or less of UCI is calculated by the following Formula (8).

$$\Delta_{TB,b,f,c}(i) = 10 \log_{10}\left(K_1\left(n_{HARQ-ACK}(i) + O_{SR}(i) + O_{CSI}(i) + O_{LBT}\right)/N_{RE}(i)\right)$$

Here, $O_{LBT}$ is the number of bits of information about interference used for receiver assisted LBT.

Similarly, BPRE including no assist interference information in PUCCH transmission of PUCCH format 2, 3, or 4 with 11 bits or more of UCI is calculated by the following Formula (9).

$$BPRE(i) = (O_{ACK}(i) + O_{SR}(i) + O_{CSI}(i))/N_{RE}(i) \qquad (9)$$

Here, the $O_{ACK}$ is the number of bits of HARQ-ACK information.

Meanwhile, BPRE including the assist interference information in PUCCH transmission of PUCCH format 2, 3, or 4 with 11 bits or more of UCI is calculated by the following Formula (10).

$$BPRE(i) = (O_{ACK}(i) + O_{SR}(i) + O_{CSI}(i) + O_{LBT}(i))/N_{RE}(i) \qquad (10)$$

Interference Measurement Outside COT

In receiver assisted LBT, interference inside COT is measured. Meanwhile, feeding back information about interference measured outside the COT as well, the base station apparatus 20 can recognize both the amount of interference inside the COT and the amount of interference outside the COT. This configuration makes it possible to recognize variation in the amount of interference between the inside of the COT and the outside of the COT, facilitating detection of the hidden node.

More specifically, in a wireless communication device other than the hidden node, transmission is stopped by LBT while the base station apparatus 20 is transmitting a signal. Meanwhile, another wireless communication device being the hidden node cannot detect the transmission of the base station apparatus 20, and there is a possibility that the other wireless communication device may start transmission even while the base station apparatus 20 is transmitting the signal. Therefore, when the variation in the amount of interference is small between the inside of the COT and the outside of the COT (e.g., an interference difference between the inside the COT and the outside the COT is equal to or smaller than a predetermined threshold), the base station apparatus 20 can recognize the presence of the hidden node.

The terminal device 40 recognizes the COT and measures interference outside the COT. In shared spectrum channel access operation, when an instruction for interference measurement outside the COT is given from the base station apparatus 20, the terminal device 40 performs CSI measurement (interference measurement) outside the COT.

In addition, the terminal device 40 distinguishes between the inside of the COT and the outside of the COT and measures interference. In other words, the terminal device 40 does not average the interference measured inside the COT and the interference measured outside the COT (interference in CSI measurement, L1-RSSI, and L3-RSSI).

The base station apparatus 20 needs to recognize whether the interference information fed back from the terminal device 40 is information measured inside the COT or information measured outside the COT. A method for distinction of information about interference will be described below.

In an example of distinction of the information about interference, information for distinction between the inside of the COT and the outside of the COT is included in feedback information, in addition to the information about interference.

In another example of the distinction of the information about interference, information for distinction between the inside of the COT and the outside of the COT is associated with the feedback resource.

Another example of the distinction of the information about interference includes the CSI trigger. Specifically, information about CSI feedback specified in the aperiodic CSI trigger is CSI information measured only inside the COT, and otherwise, the information (e.g., periodic CSI feedback) is CSI information measured inside the COT and/or outside the COT.

In addition to the distinction between the inside of the COT and the outside of the COT, the reception beams used for the measurement may be distinguished. The reception beams used for the measurement is distinguished by, for example, an SS/PBCH block index and a CSI-RS resource set index. The reception beams used for these measurements may be included in the feedback information or may be associated with other physical parameters (e.g., feedback resource, etc.).

As described above, measurement of interference both inside and outside COT by the terminal device 40 and feedback of the interference to the base station apparatus 20 facilitate detection of the hidden node based on a change in the amount of interference inside and outside COT by the base station apparatus 20.

MODIFICATIONS

The embodiments described above are merely examples, and various modifications and applications are possible.

For example, a control device that controls the base station apparatus 20, and the terminal device 40 according to the present embodiment may be implemented by a dedicated computer system or a general-purpose computer system.

For example, communication programs for performing the above-described operations are stored in a computer-readable recording medium such as an optical disk, semiconductor memory, magnetic tape, or flexible disk, for distribution. Then, for example, the programs are installed on the computer to perform the processes described above, and thereby the control device is configured. In this configuration, the control device may be a device (e.g., a personal computer) outside the base station apparatus 20 or the terminal device 40. Furthermore, the control device may be a device (e.g., the control unit 24 or the control unit 45) inside the base station apparatus 20 or the terminal device 40.

Furthermore, each of the communication programs may be stored in a disk device included in a server device on a network such as the Internet so as to be, for example, downloaded to the computer. Furthermore, the functions described above may be implemented by cooperation between an operating system (OS) and application software. In this configuration, the portion other than the OS may be stored in a medium for distribution, or the portion other than the OS may be stored in the server device for, for example, downloading or the like to the computer.

Furthermore, of the processes described in the above embodiments, all or some of the processes described to be performed automatically may be performed manually, or all or some of processes described to be performed manually may be performed automatically by a known method. In addition, the processing procedures, specific names, and information including various data and parameters, which are described in the above description or illustrated in the drawings, can be appropriately changed unless otherwise specified. For example, various information illustrated in the drawings are not limited to the illustrated information.

Furthermore, the component elements of the devices are illustrated as functional concepts but are not necessarily required to be physically configured as illustrated. In other words, specific forms of distribution or integration of the devices are not limited to those illustrated, and all or some of the devices may be configured by being functionally or physically distributed or integrated in appropriate units, according to various loads or usage conditions. Note that the configuration obtained by the distribution or integration may be formed dynamically.

Furthermore, the embodiments described above can be appropriately combined within a range consistent with the contents of the processing. Furthermore, the order of the steps illustrated in the flowcharts of the embodiments described above can be changed appropriately.

Furthermore, for example, the present embodiment can be implemented as all configurations constituting a device and system, such as a processor as a system large scale integration (LSI) or the like, a module using a plurality of the processors or the like, a unit using a plurality of modules or the like, and a set (i.e., a configuration of part of each device) obtained by further adding the other functions to the unit.

Note that, in the present embodiment, the system means an aggregation of a plurality of component elements (devices, modules (components), etc.), and it does not matter whether all the component elements are in the same housing. Therefore, a plurality of devices that is housed in separate housings and connected via a network, and one device in which a plurality of modules is housed in one housing are both systems.

Furthermore, for example, the present embodiment can adopt a configuration of cloud computing in which one function is shared between a plurality of devices via a network to perform processing by the plurality of devices in cooperation.

HARDWARE CONFIGURATION

Figure 12:
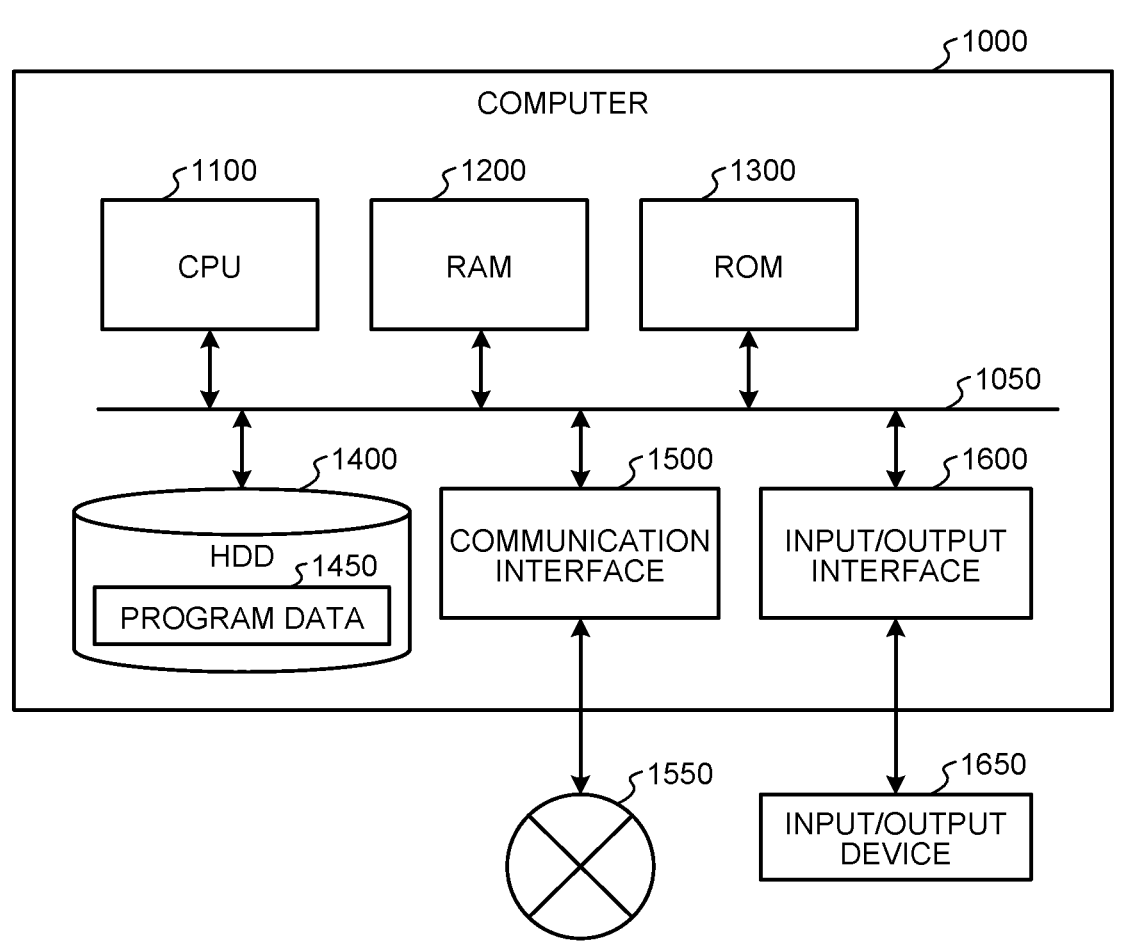
FIG. 12 is a hardware configuration diagram illustrating an example of a computer implementing the functions of the base station apparatus and terminal device.

The Communication devices such as the base station apparatuses 20 and the terminal devices 40 according to the embodiments described above are implemented by, for example, a computer 1000 having a configuration as illustrated in FIG. 12. FIG. 12 is a hardware configuration diagram illustrating an example of the computer implementing the functions of each base station apparatus 20 and each terminal device 40. An example of the base station apparatus 20 according to an embodiment will be described below. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected by a bus 1050.

The CPU 1100 is operated on the basis of programs stored in the ROM 1300 or the HDD 1400 and controls the respective units. For example, the CPU 1100 deploys a program stored in the ROM 1300 or the HDD 1400 to the RAM 1200, and performs processing corresponding to each of various programs.

The ROM 1300 stores a boot program, such as a basic input output system (BIOS), executed by the CPU 1100 when the computer 1000 is booted, a program depending on the hardware of the computer 1000, and the like.

The HDD 1400 is a computer-readable recording medium that non-transitorily records the programs executed by the CPU 1100, data used by the programs, and the like. Specifically, the HDD 1400 is a recording medium that records an information processing program according to the present disclosure that is an example of program data 1450.

The communication interface 1500 is an interface for connecting the computer 1000 to an external network 1550 (e.g., the Internet). For example, the CPU 1100 receives data from another device or transmits data generated by the CPU 1100 to another device, via the communication interface 1500.

The input/output interface 1600 is an interface for connecting an input/output device 1650 and the computer 1000. For example, the CPU 1100 receives data from an input device such as a keyboard or mouse, via the input/output interface 1600. In addition, the CPU 1100 transmits data to an output device such as a display, speaker, or printer, via the input/output interface 1600. Furthermore, the input/output interface 1600 may function as a media interface that reads a program or the like recorded on a predetermined recording medium. The medium includes, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, when the computer 1000 functions as the base station apparatus 20 according to the embodiment, the CPU 1100 of the computer 1000 executes the programs loaded on the RAM 1200 to implement the functions of the control unit 24 and the like. Furthermore, the HDD 1400 stores the programs according to the present disclosure and data stored in the storage unit 22. Note that the CPU 1100 executes the program data 1450 read from the HDD 1400, but in another example, the CPU 1100 may acquire these programs from another device via the external network 1550.

Note that the functions of the terminal device 20 can also be implemented by the computer 1000 described with reference to FIG. 12. For example, the CPU 1100 of the computer supporting this terminal device 20 executes a program loaded on the RAM 1200 to implement the functions of the control unit 25 and the like. Furthermore, the HDD 1400 stores the programs according to the present disclosure and data stored in the storage unit 42. Note that the CPU 1100 executes the program data 1450 read from the HDD 1400, but in another example, the CPU 1100 may acquire these programs from another device via the external network 1550.

CONCLUSION

As described above, according to an embodiment of the present disclosure, the terminal device 40 includes the control unit 45. The control unit 45 receives an instruction to perform channel sensing in the unlicensed band, from the base station apparatus 20. The control unit 45 performs channel sensing (e.g., receiver assisted LBT) in the channel occupancy time (COT) in which the instruction is received. The control unit 45 transmits second uplink control information (e.g., the assist interference information) that can be multiplexed with first uplink control information (e.g., other UCI) and that indicates a result of the channel sensing, to the base station apparatus 20, in the channel occupancy time. This configuration makes it possible for the base station apparatus 20 to more readily detect the hidden node to further stabilize a radio link.

Although the embodiments of the present disclosure have been described above, the technical scope of the present disclosure is not limited to the embodiments described above and various modifications can be made without departing from the spirit and scope of the present disclosure. Moreover, the component elements of different embodiments and modifications may be suitably combined with each other.

Furthermore, the effects in the embodiments described herein are merely examples, the present invention is not limited to these effects, and other effects may also be provided.

Note that the present technology can also have the following configurations.

(1)
  A communication device comprising
  a control unit
  receiving an instruction to perform sensing of a channel in an unlicensed band, from a base station apparatus;
  performing sensing of the channel in a channel occupancy time in which the instruction is received; and
  transmitting second uplink control information that can be multiplexed with first uplink control information and that indicates a result of the sensing of the channel, to the base station apparatus, in the channel occupancy time.

(2)
  The communication device according to (1), wherein
  the control unit transmits the second uplink control information without multiplexing the first uplink control information with the second uplink control information.

(3)
  The communication device according to (1) or (2), wherein
  the control information reports the result of the sensing of the channel to the base station apparatus according to whether to transmit the second uplink control information.

(4)
  The communication device according to any one of (1) to (3), wherein
  the control unit transmits at least one of the first uplink control information and the second uplink control information, according to a priority.

(5)
  The communication device according to (1), wherein
  the control unit transmits control information obtained by multiplexing the first uplink control information with the second uplink control information, to the base station apparatus, when a predetermined condition is satisfied.

(6)
  The communication device according to (1), (2) or (5) wherein
  the second uplink control information includes bit information indicating the result of the sensing of the channel.

(7)
  The communication device according to any one of (1) to (6), wherein
  a processing time required for multiplexing the first uplink control information with the second uplink control information is longer than a processing time without the multiplexing.

(8)
  The communication device according to any one of (1) to (7), wherein
  a processing time for the first uplink control information is longer than a processing time for the second uplink control information.

(9)
  The communication device according to any one of (1) to (8), wherein
  the control unit does not perform the sensing of the channel, when a period from reception of the instruction from the base station apparatus to transmission of the second uplink control information is shorter than a processing time for the second uplink control information.

(10)
  The communication device according to any one of (1) to (9), wherein
  the control unit stops transmission of a signal indicating success or failure of reception of a downlink signal in the channel occupancy time, when the result of the sensing of the channel is busy.

(11)

The communication device according to any one of (1) to (10), wherein the control unit reports the result of the sensing of the channel inside the channel occupancy time and the result of the sensing of the channel outside the channel occupancy time to the base station apparatus.

(12)

A base station apparatus comprising a control unit transmitting an instruction to perform sensing of a channel in an unlicensed band, to a communication device; and receiving a result of the sensing of the channel performed by the communication device, as second uplink control information that can be multiplexed with first uplink control information, from the communication device, in a channel occupancy time in which the instruction is transmitted.

(13)

A communication method comprising:

receiving an instruction to perform sensing of a channel in an unlicensed band, from a base station apparatus;

performing sensing of the channel in a channel occupancy time in which the instruction is received; and transmitting second uplink control information that can be multiplexed with first uplink control information and that indicates a result of the sensing of the channel, to the base station apparatus, in the channel occupancy time.

(14)

A communication method comprising:

transmitting an instruction to perform sensing of a channel in an unlicensed band, to a communication device; and receiving a result of the sensing of the channel performed by the communication device, as second uplink control information that can be multiplexed with first uplink control information, from the communication device, in a channel occupancy time in which the instruction is transmitted.

(15)

A communication program for causing a computer to function as a control unit receiving an instruction to perform sensing of a channel in an unlicensed band, from a base station apparatus;

performing sensing of the channel in a channel occupancy time in which the instruction is received; and transmitting second uplink control information that can be multiplexed with first uplink control information and that indicates a result of the sensing of the channel, to the base station apparatus, in the channel occupancy time.

(16)

A communication program for causing a computer to function as a control unit transmitting an instruction to perform sensing of a channel in an unlicensed band, to a communication device; and receiving a result of the sensing of the channel performed by the communication device, as second uplink control information that can be multiplexed with first uplink control information, from the communication device, in a channel occupancy time in which the instruction is transmitted.

REFERENCE SIGNS LIST

1 COMMUNICATION SYSTEM
20 BASE STATION APPARATUS
21, 41 SIGNAL PROCESSING UNIT
22, 42 STORAGE UNIT
23 NETWORK COMMUNICATION UNIT
24, 45 CONTROL UNIT
40 TERMINAL DEVICE
44 INPUT/OUTPUT UNIT

The invention claimed is:

1. A communication device, comprising circuitry configured to:

receive an instruction from a base station apparatus, in a first time period of a channel occupancy time;

execute, based on the received instruction, a sensing process on a channel in an unlicensed band, wherein the sensing process is executed in the first time period of the channel occupancy time; and transmit, to the base station apparatus, second uplink control information that is multiplexed with first uplink control information, wherein the second uplink control information includes an indication, the indication is based on a result of the execution of the sensing process on the channel, the indication is configured to trigger the base station apparatus to transmit a downlink signal in a downlink physical channel to the communication device within a second time period of the channel occupancy time, and the second time period is different from the first time period.

2. The communication device according to claim 1, wherein the circuitry is further configured to transmit, based on a priority, at least one of the first uplink control information or the second uplink control information to the base station apparatus.

3. The communication device according to claim 1, wherein the circuitry is further configured to:

generate, based on the second uplink control information that is multiplexed with the first uplink control information, control information; and transmit, based on a condition, the control information to the base station apparatus.

4. The communication device according to claim 1, wherein the second uplink control information includes bit information that indicates the result of the sensing process on the channel.

5. The communication device according to claim 1, wherein a processing time required for multiplexing of the first uplink control information with the second uplink control information is longer than a processing time without the multiplexing.

6. The communication device according to claim 1, wherein a processing time for the first uplink control information is longer than a processing time for the second uplink control information.

7. The communication device according to claim 1, wherein the circuitry is further configured to halt the sensing process on the channel in a case where a time period from the reception of the instruction to the transmission of the second uplink control information is shorter than a processing time for the second uplink control information.

8. The communication device according to claim 1, wherein the circuitry is further configured to:

determine the channel is busy based on the result of the sensing process on the channel; and stop, based on the determination that the channel is busy, a transmission of a signal that indicates one of a success of a reception of the downlink signal in the channel occupancy time or a failure of the reception of the downlink signal in the channel occupancy time.

9. The communication device according to claim 1, wherein the circuitry is further configured to:

transmit, to the base station apparatus, the result of the sensing process within the first time period of the channel occupancy time; or transmit, to the base station apparatus, the result of the sensing process outside of the channel occupancy time.

10. A base station apparatus, comprising circuitry configured to:

transmit, to a communication device, an instruction to execute a sensing process on a channel in an unlicensed band, wherein the instruction is transmitted in a first time period of a channel occupancy time;

receive, from the communication device, control information, wherein the control information is received in the first time period of the channel occupancy time, the control information includes second uplink control information that is multiplexed with first uplink control information, and the second uplink control information includes an indication that is based on a result of the sensing process on the channel; and determine, based on the indication, whether to transmit a downlink signal in a downlink physical channel within a second time period of the channel occupancy time, wherein the downlink signal is transmitted to the communication device, and the first time period is different from the second time period.

11. A communication method, comprising:

in a communication device:

receiving an instruction from a base station apparatus, in a first time period of a channel occupancy time;

sensing a channel in the first time period of the channel occupancy time based on the received instruction, wherein the channel is in an unlicensed band; and transmitting, to the base station apparatus, second uplink control information that is multiplexed with first uplink control information, wherein the second uplink control information includes an indication, the indication is based on a result of the sensing of the channel, the indication is configured to trigger the base station apparatus to transmit a downlink signal in a downlink physical channel to the communication device within a second time period of the channel occupancy time, and the second time period is different from the first time period.

12. A communication method, comprising:

in a base station apparatus:

transmitting, to a communication device, an instruction to execute a sensing of a channel in an unlicensed band, wherein the instruction is transmitted in a first time period of a channel occupancy time;

receiving, from the communication device, control information, wherein the control information is received in the first time period of the channel occupancy time, the control information includes second uplink control information that is multiplexed with first uplink control information, and the second uplink control information includes an indication that is based on a result of the sensing of the channel; and determining, based on the indication, whether to transmit a downlink signal in a downlink physical channel within a second time period of the channel occupancy time, wherein the downlink signal is transmitted to the communication device, and the second time period is different from the first time period.

13. A non-transitory computer-readable medium having stored thereon, computer-executable instructions which, when executed by a computer, cause the computer to execute operations, the operations comprising:

receiving an instruction from a base station apparatus, in a first time period of a channel occupancy time;

sensing a channel in the first time period of the channel occupancy time based on the received instruction, wherein the channel is in an unlicensed band; and transmitting, to the base station apparatus, second uplink control information that is multiplexed with first uplink control information, wherein the second uplink control information includes an indication, the indication is based on a result of the sensing of the channel, the indication is configured to trigger the base station apparatus to transmit a downlink signal in a downlink physical channel a communication device to within a second time period of the channel occupancy time, and the second time period is different from the first time period.

14. A non-transitory computer-readable medium having stored thereon, computer-executable instructions which, when executed by a computer, cause the computer to execute operations, the operations comprising:

transmitting, to a communication device, an instruction to execute a sensing of a channel in an unlicensed band, wherein the instruction is transmitted in a first time period of a channel occupancy time;

receiving, from the communication device, control information, wherein the control information is received in the first time period of the channel occupancy time, the control information includes second uplink control information that is multiplexed with first uplink control information, and the second uplink control information includes an indication that is based on a result of the sensing of the channel; and determining, based on the indication, whether to transmit a downlink signal in a downlink physical channel within a second time period of the channel occupancy time, wherein the downlink signal is transmitted to the communication device, and the second time period is different from the first time period.

* * * * *